United States Patent
Hirooka et al.

(10) Patent No.: US 6,945,035 B2
(45) Date of Patent: Sep. 20, 2005

(54) AUXILIARY AIR SUPPLYING SYSTEM, AND CONTROL METHODS AND FAILURE DIAGNOSTIC METHODS THEREOF

(75) Inventors: Shigemasa Hirooka, Susono (JP); Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/305,134

(22) Filed: Nov. 27, 2002

(65) Prior Publication Data

US 2003/0101716 A1 Jun. 5, 2003

(30) Foreign Application Priority Data

Nov. 30, 2001 (JP) .......................... 2001-367408
Dec. 27, 2001 (JP) .......................... 2001-397861
Jul. 22, 2002 (JP) .......................... 2002-212799

(51) Int. Cl.$^7$ .............................................. F01N 3/00
(52) U.S. Cl. ...................... 60/289; 60/274; 60/277; 60/284; 60/290; 60/293
(58) Field of Search .................. 60/274, 276, 277, 60/289, 290, 291, 292, 293, 284

(56) References Cited

U.S. PATENT DOCUMENTS

| | | | |
|---|---|---|---|
| 5,333,446 A | | 8/1994 | Itoh |
| 5,493,858 A | * | 2/1996 | Hosoya et al. ................. 60/289 |
| 5,782,086 A | * | 7/1998 | Kato et al. ..................... 60/274 |
| 5,852,929 A | * | 12/1998 | Kato et al. ..................... 60/274 |
| 5,964,811 A | * | 10/1999 | Ishii et al. ..................... 701/29 |
| 6,192,678 B1 | * | 2/2001 | Tachibana ..................... 60/289 |
| 6,393,833 B2 | * | 5/2002 | Mizoguchi .................... 60/289 |
| 6,408,617 B1 | * | 6/2002 | Takaku et al. ................. 60/277 |

FOREIGN PATENT DOCUMENTS

| | | |
|---|---|---|
| DE | 44 34 835 A1 | 4/1995 |
| DE | 44 32 577 A1 | 3/1996 |
| JP | A 6-17645 | 1/1994 |
| JP | A 6-248937 | 9/1994 |
| JP | A 9-21312 | 1/1997 |
| JP | A 9-125945 | 5/1997 |

* cited by examiner

Primary Examiner—Binh Q. Tran
(74) Attorney, Agent, or Firm—Oliff & Berridge, PLC

(57) ABSTRACT

When the determination result of failure determination at a start of AI (auxiliary air injection=supply) is that there is a possibility of a closing anomaly due to freezing, a reevaluation process 1 being a reevaluation after a warm-up is performed. When the determination result of determination at an end of AI is that there is a possibility of an opening anomaly due to freezing, a reevaluation process 2 being a reevaluation after a warm-up is performed.

43 Claims, 23 Drawing Sheets

AUXILIARY AIR SUPPLYING SYSTEM, AND CONTROL METHODS AND FAILURE DIAGNOSTIC METHODS THEREOF

BACKGROUND OF THE INVENTION

1. Field of the Invention

The present invention relates to auxiliary air supplying system for supplying auxiliary air to upstream of an exhaust emission control device in an exhaust system of an internal combustion engine, and to control methods and failure diagnostic methods thereof.

2. Related Background Art

As an exhaust emission control device of an internal combustion engine, there is a known system in which a catalytic converter is provided in the exhaust system to reduce CO, HC, NOx components, and others in the exhaust gas. Furthermore, there is the known technology of supplying auxiliary air through an auxiliary air inlet line provided with a control valve connected to an exhaust pipe, into the exhaust pipe to increase the oxygen content so as to induce secondary combustion of HC and CO in the exhaust gas, thereby facilitates cleaning-up the exhaust gas.

In such auxiliary air supplying system, if something unusual occurs in a component such as an air pump or the control valve, the emission control efficiency will decrease, so as to worsen the emission. Therefore, the unusual conditions must be evaluated in the early stage. The known techniques of detecting such unusual condition include the technologies disclosed in JP 09-21312 A and JP 09-125945 A.

The former describes the technology of disposing a pressure sensor between the air pump and the control valve on the auxiliary air inlet line and detecting the anomaly of the auxiliary air supplying system on the basis of detected pressure values. The latter describes the technology of disposing a pressure sensor on the auxiliary air inlet line and detecting the anomaly of the auxiliary air supplying system on the basis of detected pressure pulse width or the difference between maximum and minimum values thereof.

JP 06-17645 A discloses the technology of enabling switching between supply of auxiliary air to the exhaust port and supply of auxiliary air to upstream of the emission control device and temporarily communicating the exhaust port with the auxiliary air inlet line upstream of the emission control device at the time of halting the engine to discharge condensed water in the passage, thereby preventing blockage of the auxiliary air inlet line due to freezing.

SUMMARY OF THE INVENTION

However, the preceding two technologies permit the detection of the anomaly of the auxiliary air supplying system itself, but it is difficult to accurately determine which component has an anomaly of what kind. Furthermore, it is impossible to detect an anomaly in the case of such a malfunction that pressure values and pressure pulse width demonstrate normal values even though a component is not functioning normally. Particularly, they have the problem that the temporary anomaly due to freezing cannot be accurately discriminated.

The latter technology is effective to prevention of freezing failure, but it involves manipulation of a transfer valve to induce discharge of water by gravity. Therefore, the pipe of the auxiliary air system itself has to be arranged to allow natural discharge of water, so that it is impossible to discharge condensed water in a complicated component such as a valve or a pump. As a consequence, if the system is left to stand at low temperatures during a standstill period of the engine, the remaining condensed water will be frozen, so as to raise the possibility of disabling supply of auxiliary air at a restart.

An object of the present invention is therefore to provide auxiliary air supplying system that permits accurate determination of the temporary anomaly due to freezing in the auxiliary air supplying system or secure discharge of condensed water, and provide control methods and failure diagnostic methods of the auxiliary air supplying system.

In order to achieve the above object, an auxiliary air supplying system and a control method thereof according to the present invention are configured so that if there is a possibility of freezing, an auxiliary air inlet line is opened after a complete warm-up to purge air therefrom.

When the auxiliary air inlet line is opened after the warm-up in this way, it is feasible to securely discharge water remaining in this line, so that no water remains in the auxiliary air supplying device at the time of halting the engine, which can securely prevent the freezing during the halt of the engine.

If the air is forced supplying by the air pump in this state, it is feasible to securely discharge the condensed water remaining, particularly, in the air pump and upstream thereof, which is preferable. Furthermore, the system may also be configured so as to estimate a staying position of condensed water and switch activation/deactivation of the air pump or adjust a purge time length according to the estimated position.

Another auxiliary air supplying system and a failure diagnostic method thereof according to the present invention are configured so that a diagnosis of failure is carried out at a cold start-up and so that when the result of the diagnosis predicts an anomaly due to freezing, a reevaluation is carried out after a warm-up.

In the case of a temporary anomaly due to freezing of condensed water or the like, the equipment will normally operate after the warm-up melts the frozen condensed water or the like. Therefore, by performing the reevaluation after the warm-up, it is feasible to determine whether an anomaly is a temporary anomaly due to freezing or a permanent anomaly for other reasons.

It is preferable to purge the auxiliary air inlet line according to the result of the failure diagnosis. By performing the failure diagnosis and then purging the auxiliary air inlet line according to the result of the diagnosis, it is feasible to prevent wasteful purge, i.e., excessive auxiliary air supply, thereby suppressing degradation of emission. On the other hand, if condensed water remains, it can be securely discharged by the purge, so that freezing thereof can be prevented during the halt of the engine.

Alternatively, the system may also be arranged in a configuration wherein a diagnosis of failure is carried out during a cold start-up, wherein when the result of the diagnosis predicts an anomaly due to freezing, purging the auxiliary air inlet line is performed after a warm-up, and wherein a reevaluation is performed thereafter. This configuration permits further improvement in accuracy of discrimination between the freezing failure and the other failures.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes, and modifications within the spirit and scope of the invention will become apparent to those skilled in the art from this detailed description.

DESCRIPTION OF THE PREFERRED EMBODIMENTS

Figure 1:
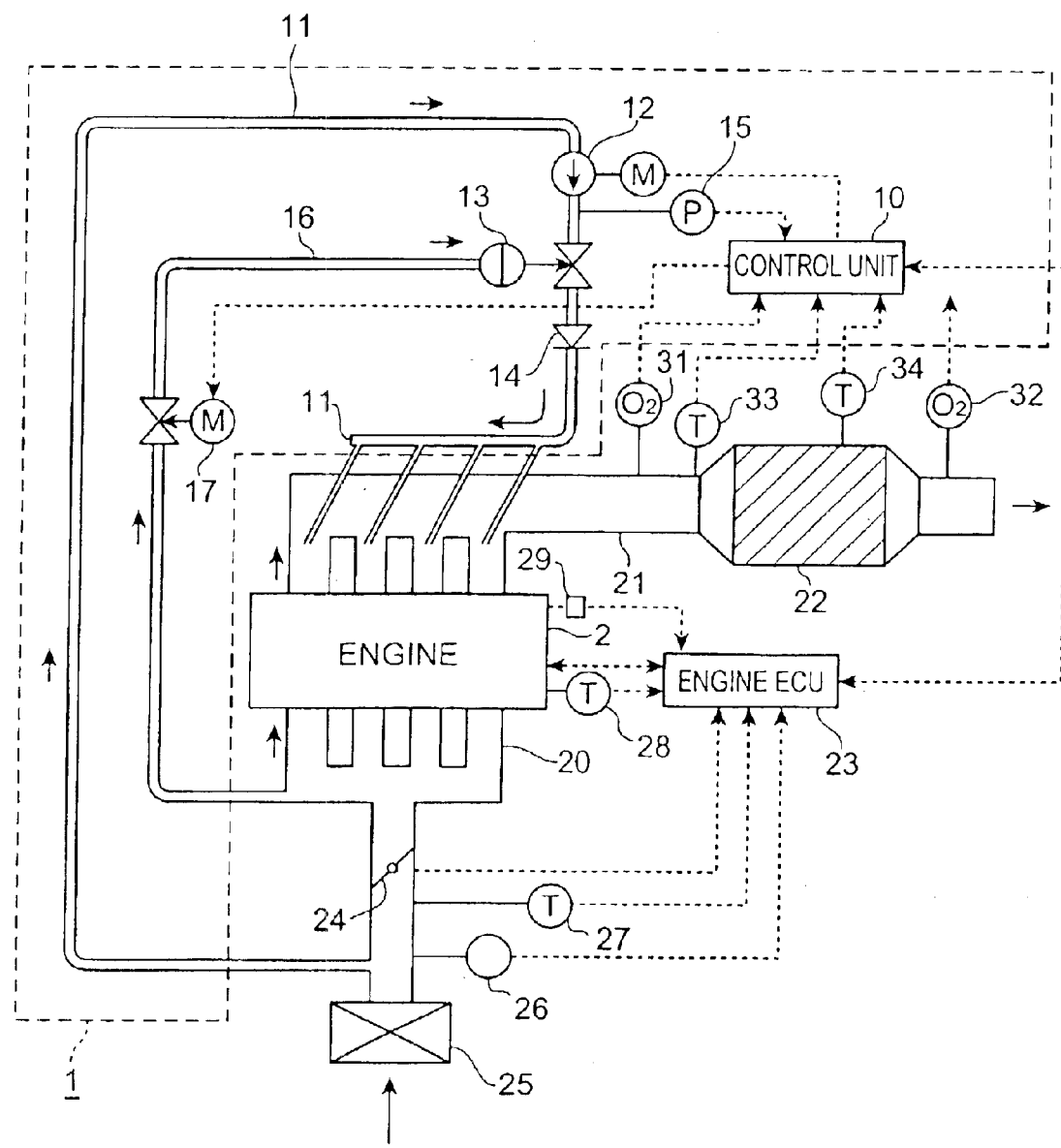
FIG. 1 is a schematic representation of an internal combustion engine incorporating a auxiliary air supplying system according to the present invention.

The preferred embodiments of the present invention will be described below in detail with reference to the accompanying drawings. To facilitate the comprehension of the explanation, the same reference numerals denote the same parts, where possible, throughout the drawings, and a repeated explanation will be omitted.

FIG. 1 is a schematic representation showing a configuration of a auxiliary air supplying system 1 according to the present invention. This auxiliary air supplying system 1 is used while being mounted on a multicylinder gasoline engine (hereinafter referred to simply as an engine) 2, which is an internal combustion engine. Here the engine 2 is equipped with an intake pipe 20 and an exhaust pipe 21, a throttle valve 24 is disposed in the intake pipe 20, and the intake pipe 20 is coupled to an air filter 25. An air flow meter 26 for measuring the amount of intake air (amount of primary intake air) and an intake air temperature sensor 27 for measuring the temperature of intake air THA are disposed between the air filter 25 and the throttle 24. The engine 2 is also equipped with a cooling water temperature sensor 28 for measuring the temperature of engine cooling water THW and an engine speed sensor 29 for measuring the engine speed NA. An engine ECU 23 for controlling the engine receives outputs from these air flow meter 26, inlet air temperature sensor 27, cooling water temperature sensor 28, and engine speed sensor 29, and also accepts supply of other information including an opening of the throttle 24 and the like.

On the other hand, a three-way catalytic converter (TWC) 22 is located at a downstream position in the exhaust pipe 21, and $O_2$ sensors 31, 32 for detecting an oxygen content in the exhaust gas are disposed both upstream and downstream of the TWC 22. There are also provided a temperature sensor 33 for detecting the exhaust temperature upstream of the TWC 22, and a temperature sensor 34 for detecting the catalyst temperature of the TWC 22. The $O_2$ sensors may be replaced by A/F sensors or linear $O_2$ sensors. The temperature sensor 33 may be located anywhere downstream of an air inlet line 11 on the exhaust pipe 21.

The auxiliary air supplying system 1 is provided with the auxiliary air inlet line 11, which connects a position between the air filter 25 and the throttle 24 on the intake pipe 20 with a position between the engine 2 and the upstream $O_2$ sensor 31 on the exhaust pipe 21, and there are an electric motor operated type air pump (AP) 12, an air switching valve (ASV) 13, and a reed valve (RV) 14 as a check valve placed in the order named from the intake pipe 20 side on the auxiliary air inlet line 11. A pressure sensor 15 is disposed between AP 12 and ASV 13. A pipe 16 extending from the intake pipe 20 downstream of the throttle 24 is connected to ASV 13 and a solenoid operated valve (SOV) 17 is further placed on this pipe 16.

A control unit 10 for controlling the operation of the auxiliary air supplying system 1 is coupled to the engine ECU 23 by a signal line so as to be able to exchange information with each other, accepts supply of output signals from the pressure sensor 15 and the $O_2$ sensors 31, 32, and also controls drive of a motor for AP 12 and opening/closing of the SOV 17. The control unit 10 may constitute part of the engine ECU 23.

This auxiliary air supplying system 1 is configured as follows: in a state in which the fuel content is high, mainly, at cold starting or the like, the air/fuel ratio (A/F) is thus low, and the TWC 22 is not warmed up well yet to a temperature enough to fully demonstrate its function, the control unit 10 opens the SOV 17 to guide the negative pressure inside the intake pipe 20 to ASV 13 to open the ASV 13, and actuates the AP 12, whereby part of air having passed through the air filter 25 is guided through the auxiliary air inlet line 11 into the exhaust pipe 21 to increase the oxygen content in the exhaust gas and increase A/F thereof, so as to promote secondary combustion of HC and CO in the gas in the exhaust pipe 21 and thus cleans up the exhaust emission and whereby the exhaust temperature is increased to accelerate temperature increase of the TWC 22, thereby suppressing the degradation of the emission. Hereinafter, this auxiliary air supply control will be called AI (Auxiliary air Injection) control. It is noted that a solenoid operated valve can also be directly used at the part of ASV 13, instead of the combination of ASV 13 with the SOV 17.

Since the auxiliary air supplying system is often activated during low temperature periods in this way, condensed water, if remaining in the inlet line 11, can be frozen to block up the line 11 and can possibly cause malfunctions of AP 12, ASV 13, and RV 14. If the auxiliary air supply is to be performed during such freezing failures, it can induce damage of the components. On the other hand, it is also necessary to prevent a misjudgment that a temporary failure due to freezing is judged as an ordinary failure. The auxiliary air supplying system according to the present invention is configured to permit the temporary failure due to freezing to be detected distinctively from the other failures of the components and also permit the condensed water to be securely discharged during operation so as to prevent the freezing during halt periods. Specific failure diagnostic method and control methods will be described below. A failure diagnostic method and condensed water discharge control methods will be first described individually and then combinational control thereof will be described.

Figure 2:
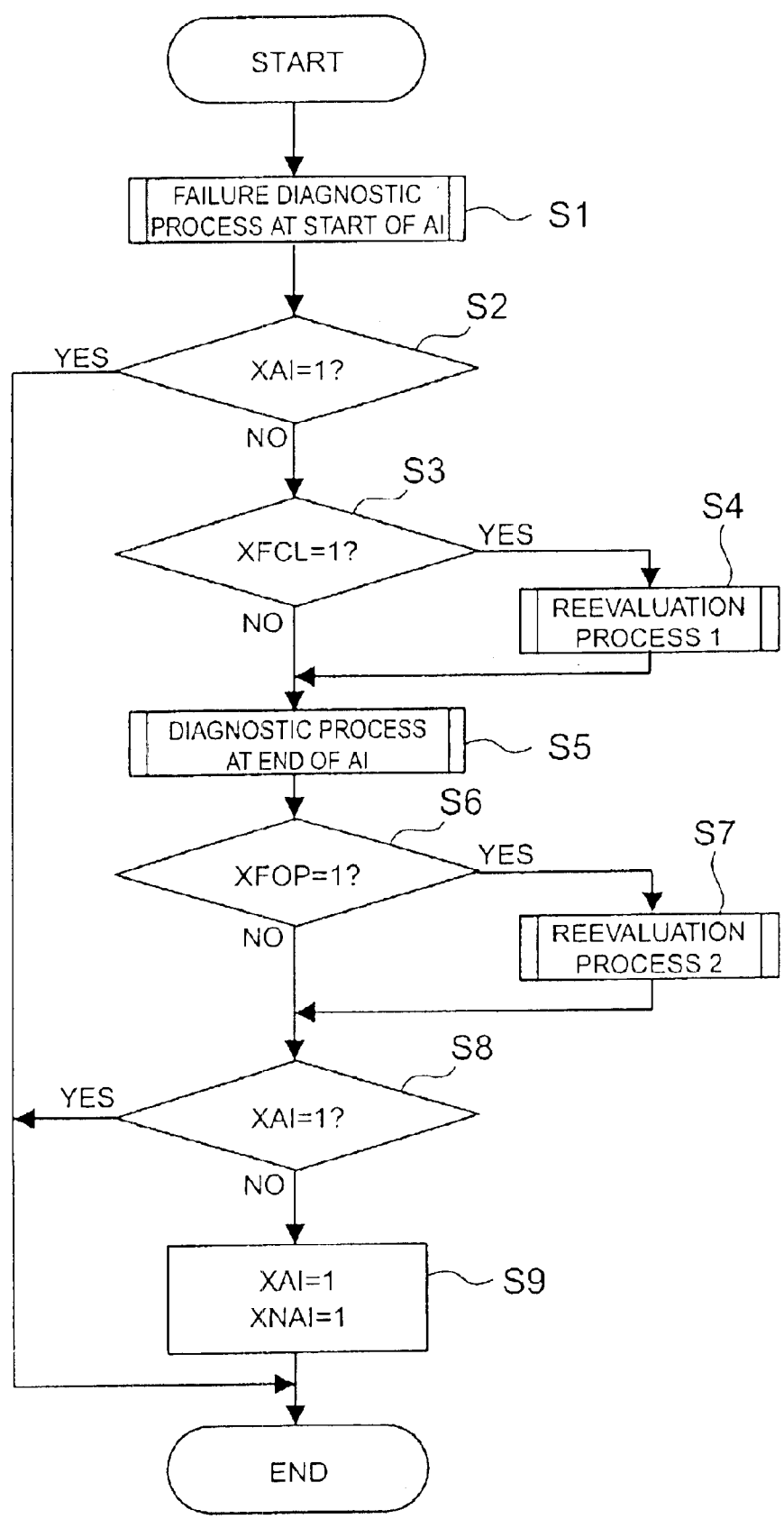
FIG. 2 is a flowchart of a main process of a failure diagnostic method in the apparatus of FIG. 1.
Figure 3:
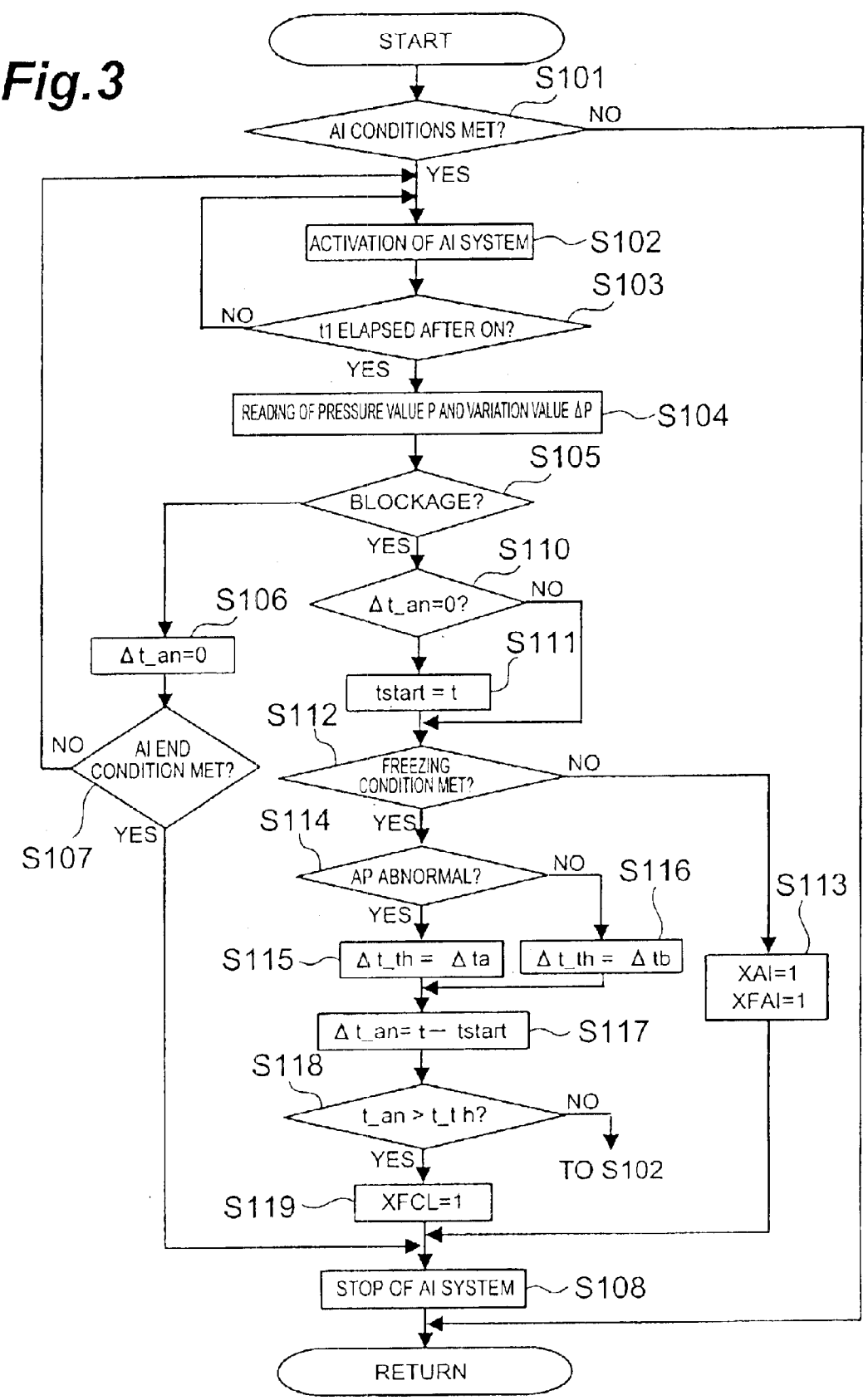
FIG. 3 is a flowchart showing the details of a failure determination process at starting of auxiliary air supply.
Figure 6:
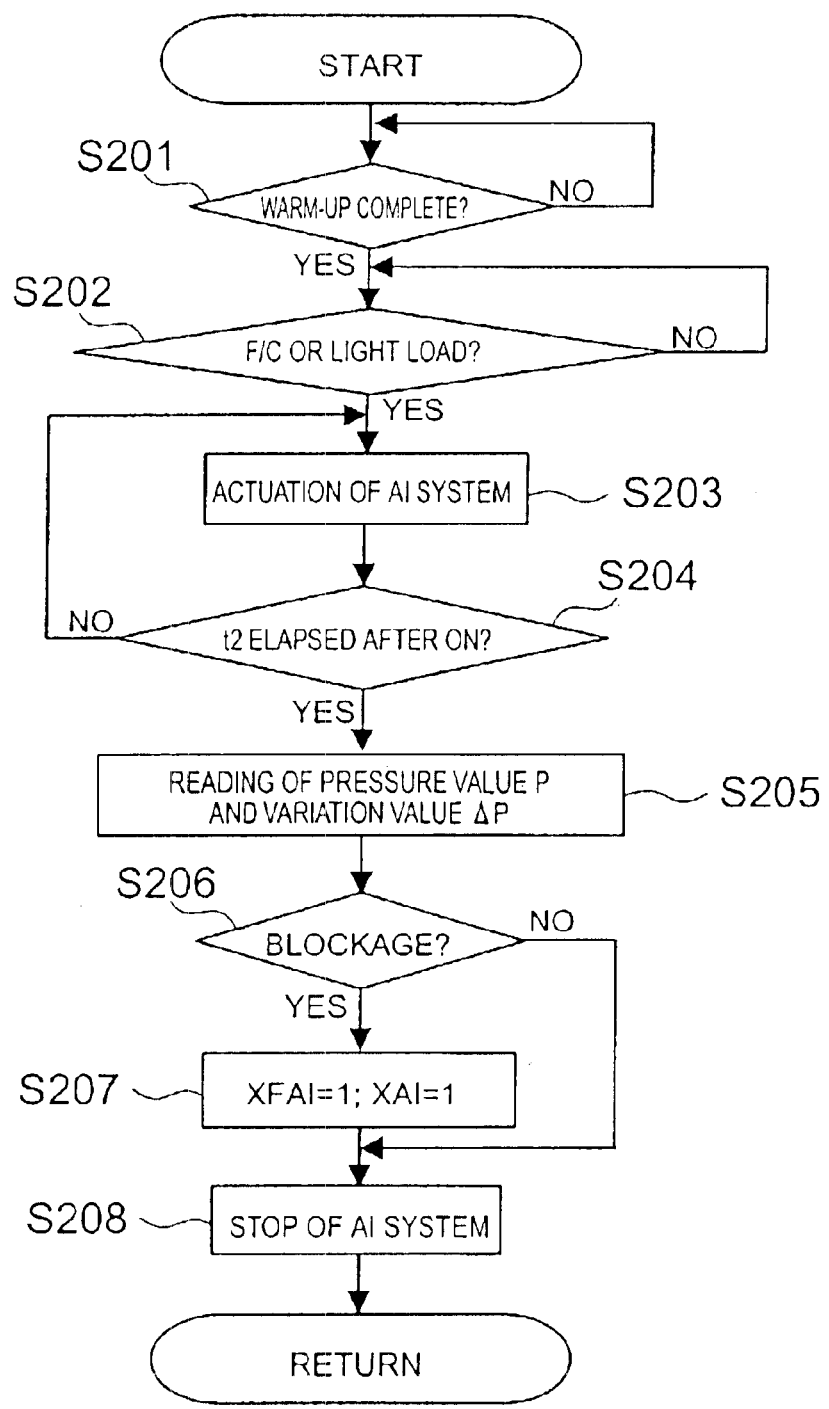
FIG. 6 is a flowchart showing the details of a reevaluation process 1 in FIG. 2, FIG. 7 a flowchart showing the details of a failure determination process at ending of auxiliary air supply in FIG. 2, and FIG. 8 a flowchart showing the details of a reevaluation process 2 in FIG. 2.

FIG. 2 is a main flowchart of a failure diagnostic method in the present embodiment, and FIGS. 3 and 6 are flowcharts to detail part of processing shown in FIG. 2. This control is performed by the control unit 1 in cooperation with the engine ECU 23, and the processing is started at a start-up of the engine 2 to be executed only once in parallel with other processing.

First, step S1 is to perform a failure determination at starting of AI. The details of the process are presented in FIG. 3. At step S101, the control unit first checks whether AI conditions are met. The AI execution conditions are determined by the engine cooling water temperature, intake air temperature, passing time since starting, battery voltage, load condition, etc. fed from the engine ECU 23. If the conditions are not met to end in determining that there is no need for execution of the AI control, the control unit proceeds to end the processing. When the AI execution conditions are unended, the control unit waits until the execution conditions are met. Once the execution conditions are met, the control unit transfers to step S102.

At step S102, the AI system is actuated. Specifically, the solenoid operated valve 17 is opened to guide the negative pressure inside the intake pipe 20 to ASV 13 to open the ASV 13, and AP 12 is actuated to guide part of air having passed through the air filter 25, through the auxiliary air inlet line 11 into the exhaust pipe 21.

Figure 4:
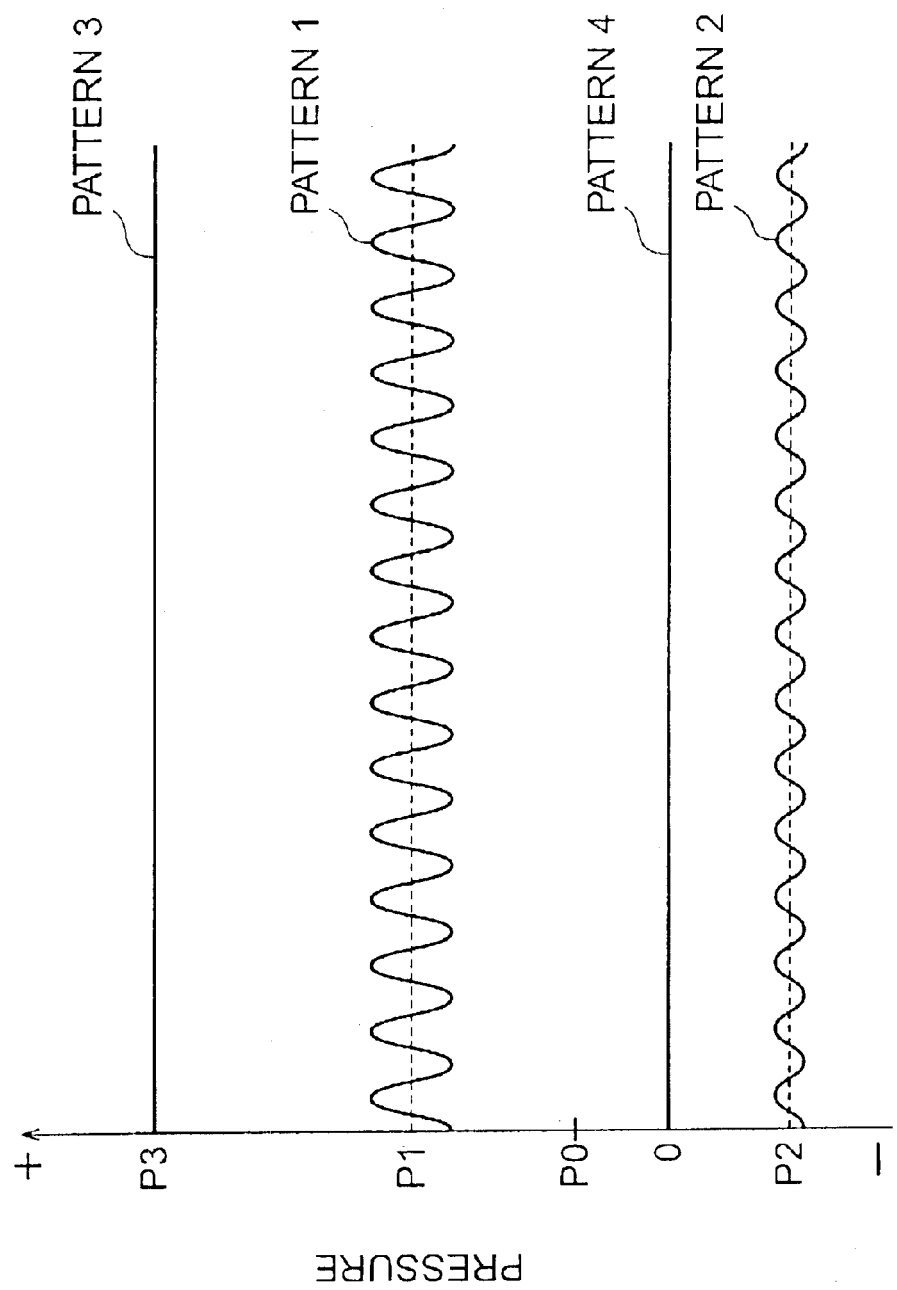
FIG. 4 is a graph showing pressure variation patterns in the exhaust pipe.

Step S103 is to determine whether a time t1 has elapsed since the starting of the AI system. When the time has not elapsed yet, the process returns directly to step S102 to perform a loop process, thereby standing by with execution of AI control. After the time t1 has elapsed, the process transfers to step S104 to read a pressure value P and a pressure variation value ΔP. Step S105 is to determine whether there occurs blockage of the auxiliary air inlet line 11 (including inaction of AP 12 and closed locking of ASV 13 and RV 14), based on the pressure value P and pressure variation value ΔP thus read. Specifically, in a normal state without blockage, it is considered that the pressure P should be over the atmospheric pressure and undergo pressure variation along with pressure variation downstream, as indicated by pattern 1 in FIG. 4. In contrast to it, in a situation in which there occurs the blockage of the passage, including the closed locking of ASV 13 or RV 14, while AP 12 is normally operating, the pressure P is considered to be maintained at a certain high pressure, as indicated by pattern 3. In an inactive state of AP 12, the pressure varies as indicated by pattern 2, without blockage of the passage, but the pressure is maintained at the atmospheric pressure as indicated by pattern 4, with blockage of the passage. Accordingly, a determination of a blockage anomaly can be made in the case of the patterns except for the pattern 1.

Without the blockage anomaly (including an opened locking anomaly of ASV 13 and RV 14 and a non-stop anomaly of AP 12), the process transfers to step S106 to reset the value of an anomaly continuation time Δt_an to 0. Then the process moves to step S107 to determine whether an AI end condition is met. When the AI end condition is not met, the control unit 10 runs a loop process of going again to step S102, thereby continuing the AI control unless the blockage anomaly is detected. Once the end condition is met, the process transfers to step S108 to stop the AI system and end the processing. Specifically, the SOV 17 is closed to close ASV 13, and the drive of AP 12 is terminated.

When a determination of blockage is made at step S105, the process moves to step S110 to evaluate the value of anomaly continuation time Δt_an. When Δt_an is 0, the present time t is set as tstart. In a situation in which the anomaly is continuously detected and Δt_an is not 0, the process moves to step S112 while maintaining the value of tstart. Step S112 is to determine whether a freezing condition is met. For example, a condition that either the minimum intake air temperature THAmin since starting or the engine cooling water temperature TWAS at starting is less than 5° C., is set as a freezing condition for possible freezing. Unless the freezing condition is met, the failure is considered to be not the freezing failure but the equipment failure, and thus the process proceeds to step S113 to set 1 in a flag XAI indicating the determination result and set 1 in a flag XFAI indicating the equipment failure, and then goes to step S108 to stop the AI system and end the processing in order to prevent a secondary failure.

When it is determined at step S112 that the freezing condition is met, the process proceeds to step S114 to determine whether there is an AP anomaly. When the time variation of the pressure value P is represented by the pattern 3 of FIG. 4, a determination of no anomaly is made. When the time variation of the pressure value P is represented by the pattern 2 or 4, a determination of an anomaly is made. With the anomaly, the process proceeds to step S115 to set Δta as a determination threshold Δt_th for the anomaly continuation time Δt_an. Without the anomaly, the process transfers to step S116 to set Δtb as a determination threshold Δt_th for the anomaly continuation time Δt_an. Here Δta<Δtb.

At subsequent step S117 a difference is calculated between tstart and the present time t to obtain the anomaly continuation time Δt_an. After the calculation, the process moves to step S118 to compare the anomaly continuation time Δt_an with the set determination threshold Δt_th. When Δt_an is not more than Δt_th, the process returns to step S102 to continue the processing. When Δt_an is greater than Δt_th on the other hand, the process transfers to step S119 to set 1 in a freezing closure flag XFCL, and thereafter transfers to step S108 to stop the AI system.

Figure 5:
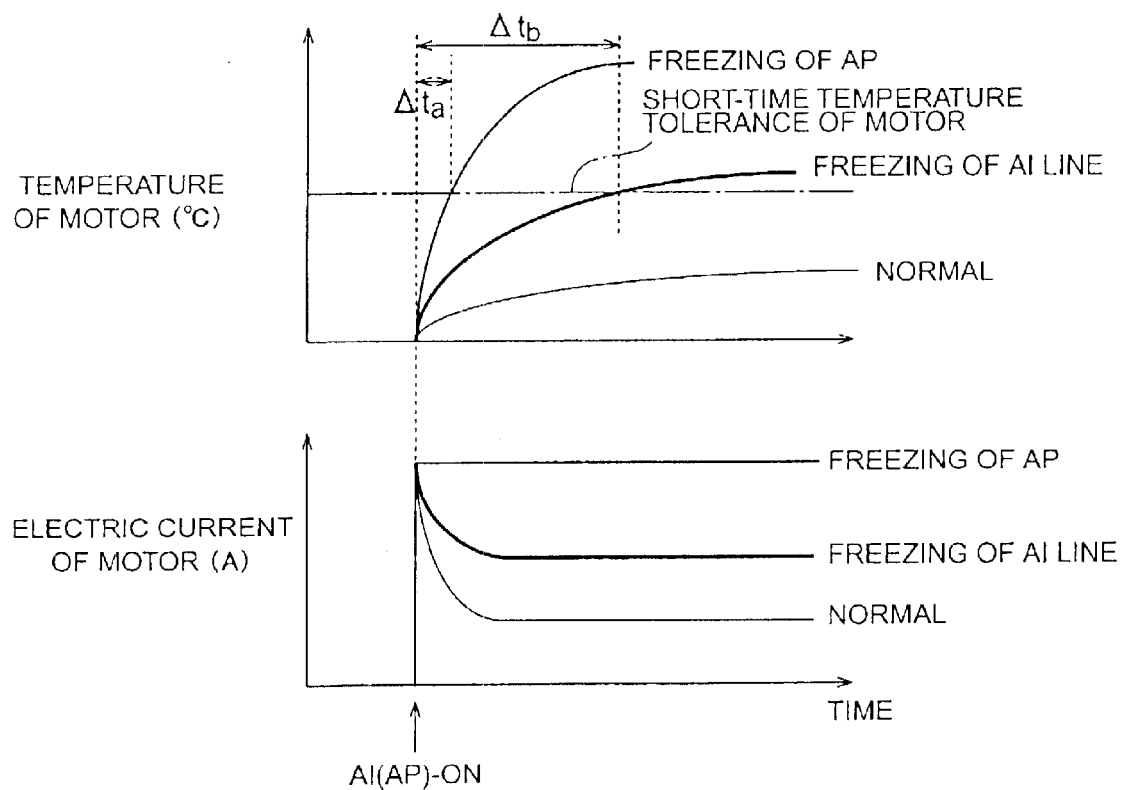
FIG. 5 is graphs showing current and temperature changes of a motor for driving AP 12, against states of the auxiliary air supplying system.

In the case where there is a possibility of the freezing failure and AP 12 is active, the operation of AP 12 is continued for a relatively long time, as described above, to promote melting of ice in the case of the temporary failure due to freezing and perform the secure failure determination. On the other hand, in the case where there is a possibility that AP 12 is inactive because of freezing, the determination threshold of the anomaly continuation time is set at the short time and AP 12 is forced to stop, thereby preventing secondary damage of AP 12. FIG. 5 is a graph showing current and temperature changes of the motor for driving AP 12, against states of the AI system. During the freezing period of AP 12 the motor for driving AP 12 can possibly increase its temperature to the temperature tolerance faster than during the other line freezing period, and thus can be damaged. Therefore, Δta and Δtb are set at their respective times shorter than those at the temperature tolerance, thereby permitting the secure determination while suppressing the damage of AP 12.

After completion of the processing of FIG. 3, the process returns to the processing of FIG. 2 and goes to next step S2 to check the value of the determination result XAI. When XAI is 1, the control unit 10 determines that there occurs a failure of a component and skips the subsequent processing to end the processing. When XAI is 0, the control unit 10 determines that the determination is unended, and then the process moves to step S3. Step S3 is to check the value of the freezing closure flag XFCL. Since XFCL of 1 indicates that it was determined at step S1 that there was the possibility of temporary blockage due to freezing, the process transfers in that case to step S4 to perform the reevaluation process 1. The details of the process are presented in FIG. 6.

First step S201 is to perform a loop process of awaiting completion of the warm-up before transfer to the next step. The determination on completion of the warm-up can be made based on the engine water cooling temperature TWA and the exhaust temperature detected by the temperature sensor 33. When it is determined that the warm-up is complete, the process proceeds to step S202 to perform a loop process of awaiting a fuel cut (F/C) or light load condition being met, before transfer to the next step. When the condition is met, the process transfers to step S203 to actuate the AI system. Step S204 is to determine whether a time t2 has elapsed since the start of actuation of the AI system. When the time t2 has not elapsed yet, the control unit 10 runs a loop process of returning to step S203. After the time t2 has elapsed, the process transfers to step S205.

Step S205 is to read the pressure value P and variation value thereof ΔP. Step S206 is to again determine whether there occurs the blockage of the, auxiliary air inlet line 11 (including the inaction of AP 12, and the closed locking of ASV 13 and RV 14), as at step S105. In the case of the temporary failure due to freezing, the warm-up melts the frozen condensed water to allow the equipment to operate normal. Therefore, it becomes feasible to determine whether the failure is the temporary failure due to freezing, or any failure other than it, by performing the reevaluation after a lapse of a sufficient time since the start of the warm-up.

With the determination of blockage, the process goes to step S207 to set 1 in the flag XAI indicating the determination result and set 1 in the flag XFAI indicating the equipment failure, and then goes to step S208 to stop the AI system and end the processing in order to prevent the secondary failure. Without the determination of blockage, the process moves from step S206 directly to step S208 to stop the AI system and end the processing. In this case, the value of XAI remains as the initial value of 0.

After completion of the processing of FIG. 6, the process returns to the processing of FIG. 2 and then transfers to next step S5. On the other hand, when the freezing closure flag XFCL is 0 at step S3, the process moves directly to step S5. This step S5 is to perform a failure determination process of the AI supply system on the basis of the pressure behavior at ending of AI. The details of this process are presented in FIG. 7.

Step S301 is to determine whether a time t3 sec or more has elapsed since the stop of the AI system. When the time t3 has not elapsed yet, the control unit 10 runs a loop process of returning to step S301. After the time t3 has elapsed, the process transfers to step S302. Step S302 is to read the pressure value P and variation value thereof ΔP. Subsequent step S303 is to determine whether AP 12 is in action. This determination can be made based on whether the pressure value is raised. When AP 12 is in action, AP 12 must have a constant operation anomaly and the process thus moves to step S306 to set 1 in the flag XAI indicating the determination result and also set 1 in the flag XFAI indicating the equipment failure, and then ends the processing.

When AP 12 is at a halt, the process transfers to step S304 to determine whether ASV 13 or RV 14 is in an open failure state. When it is determined that ASV 13 or RV 14 is not in the open failure state, the process skips the subsequent processing and ends the processing. With a determination of the open failure state, the process transfers to step S305 to determine whether the freezing condition is met. The freezing condition can be the same as the freezing condition at step S112. When the freezing condition is not met, the problem is considered to be not the freezing failure but the equipment failure, and thus the process transfers to step S306 to set 1 in the flag XAI indicating the determination result and set 1 in the flag XFAI indicating the equipment failure, and then ends the processing. On the other hand, when the freezing condition is met, there is the possibility of the temporary failure due to freezing and thus the process transfers to step S307 to set 1 in a freezing open flag XFOP, and then ends the processing.

Figure 7:
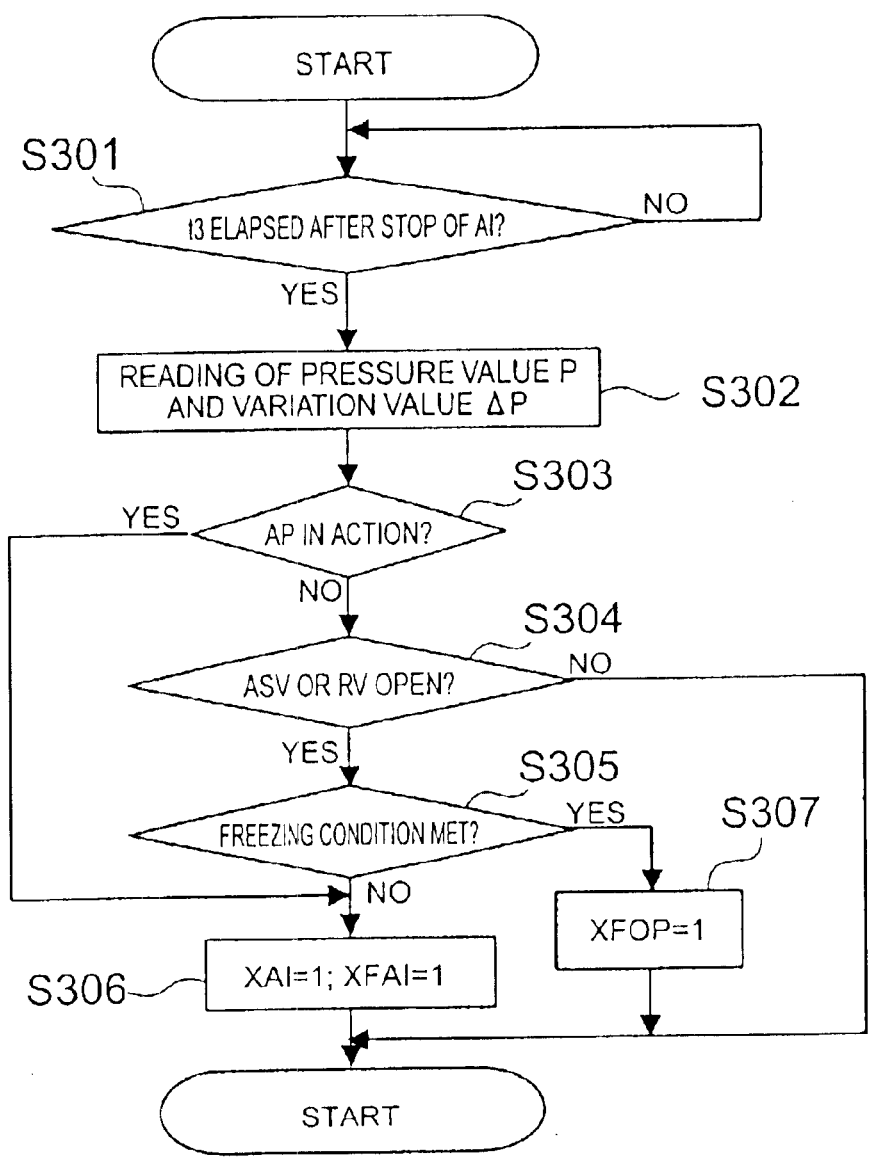

After completion of the processing of FIG. 7, the process returns to the processing of FIG. 2 and then transfers to next step S6 to check the value of the freezing open flag XFOP. Since XFOP of 1 indicates that it was determined at step S5 (more specifically, at step S307 in FIG. 7) that there was the possibility of the temporary open failure due to freezing, the process transfers in that case to step S7 to perform the reevaluation process 2. The details of this process are presented in FIG. 8.

First step S401 is to perform a loop process of awaiting a lapse of a time t4 since the stop of AI before transfer to the next step. Here t4>t3, and thus the time t4 is set as a time enough to melt the frozen condensed water in the AI system by the exhaust gas at high temperature. After the time t4 has elapsed since the stop of AI, the process moves to step S402 to read the pressure value P and variation value thereof ΔP.

Step S403 is to check whether ASV 13 is in a closed state. Since the AI system is at a halt at this point, a control state of ASV 13 by the SOV 17 must be set as a closed state. When step S403 ends in determining that ASV 13 is open, there is a possibility of an open locking failure for some reason other than freezing, and thus the process transfers to step S408 (the details of processing thereafter will be described later). On the other hand, when ASV 13 is set in the closed state as expected as a control state, the process goes to step S404. Step S404 is to open ASV 13 by activating the solenoid operated valve 17 while keeping AP 12 at a standstill. Step S405 is to perform a loop process of awaiting a lapse of a time t5 since the opening control, before transfer to the next step. After the time t5 has elapsed since the opening control, the process goes to step S406 to again read the pressure value P and the pressure variation value ΔP. Step S407 is to determine whether RV 14 is normal or abnormal. When the pressure variation is one indicated by the pattern 2 in FIG. 4, the control unit determines that RV 14 is in an open locking state, then the process transfers to step S408 to set 1 in the flag XAI indicating the determination result and also set 1 in the flag XFAI indicating the equipment failure, and thereafter transfers to step S409. When RV 14 is normal, the process unit transfers directly to step S409 to close ASV 13.

Figure 8:
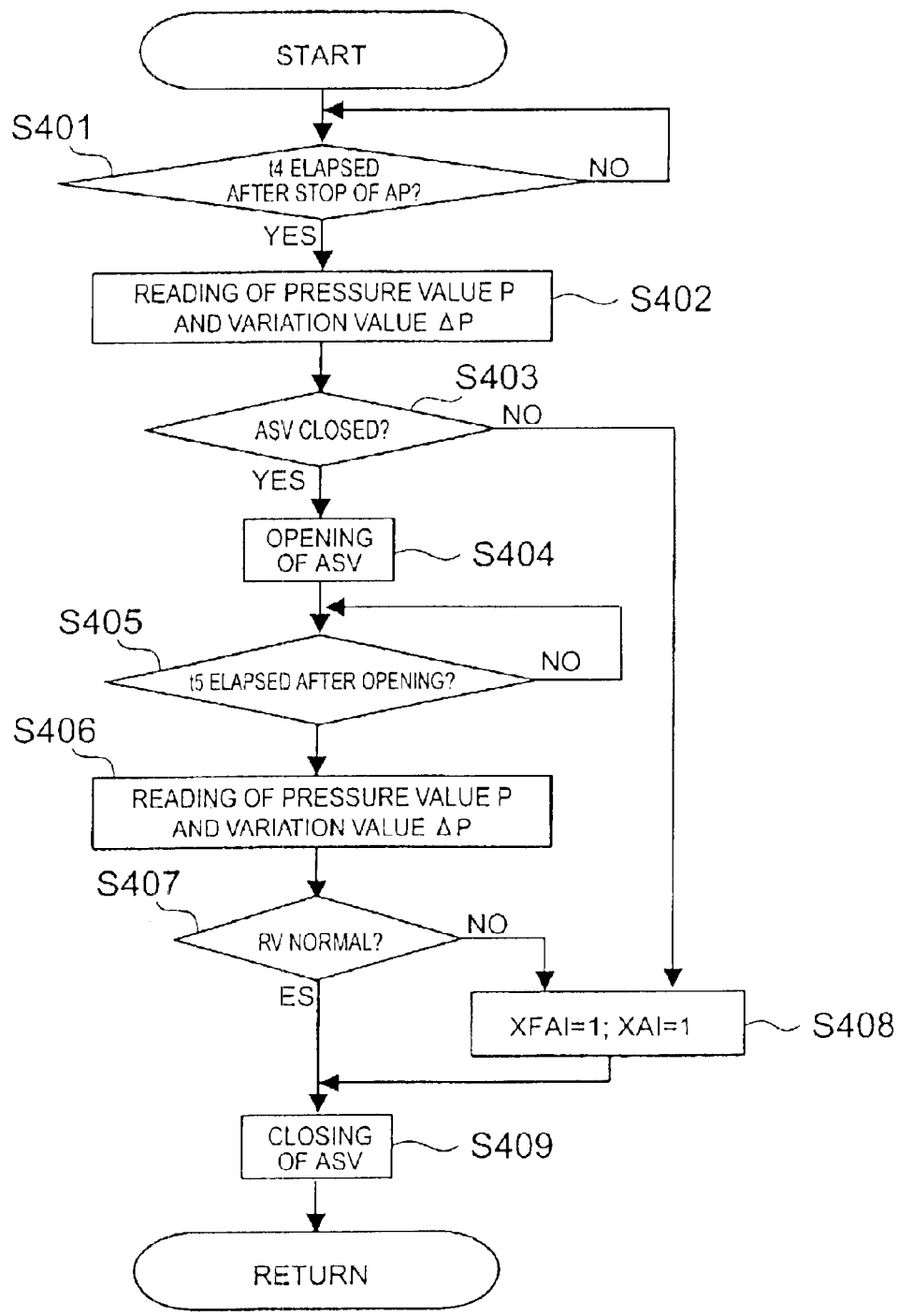

After completion of the processing of FIG. 8, the process returns to the processing of FIG. 2 and then transfers to next step S8. On the other hand, when XFOP is 0 at step S6, the process transfers directly to step S8. This step S8 is to again check the value of the determination result XAI. When XAI is 1, the control unit determines that there occurs a failure of a component and then the process skips the subsequent processing to end the processing. Since XAI of 0 indicates the situation other than the case where XAI was set to 1 on the basis of the determination on the failure of the components, the control unit thus determines that the components function normal, then the process moves to step S9 to set 1 indicating a determination end in XAI and set 1 indicating that the components are normal, in the flag XNAI, and then ends the processing.

It is noted that the processing flow described above is just an example and that a variety of changes and modifications can be made therein. For example, it is also possible to simultaneously perform the determination at ending of AI (step S5) and the reevaluation process 2 (step S7).

The following will specifically describe some condensed water discharge control methods.

Figure 9:
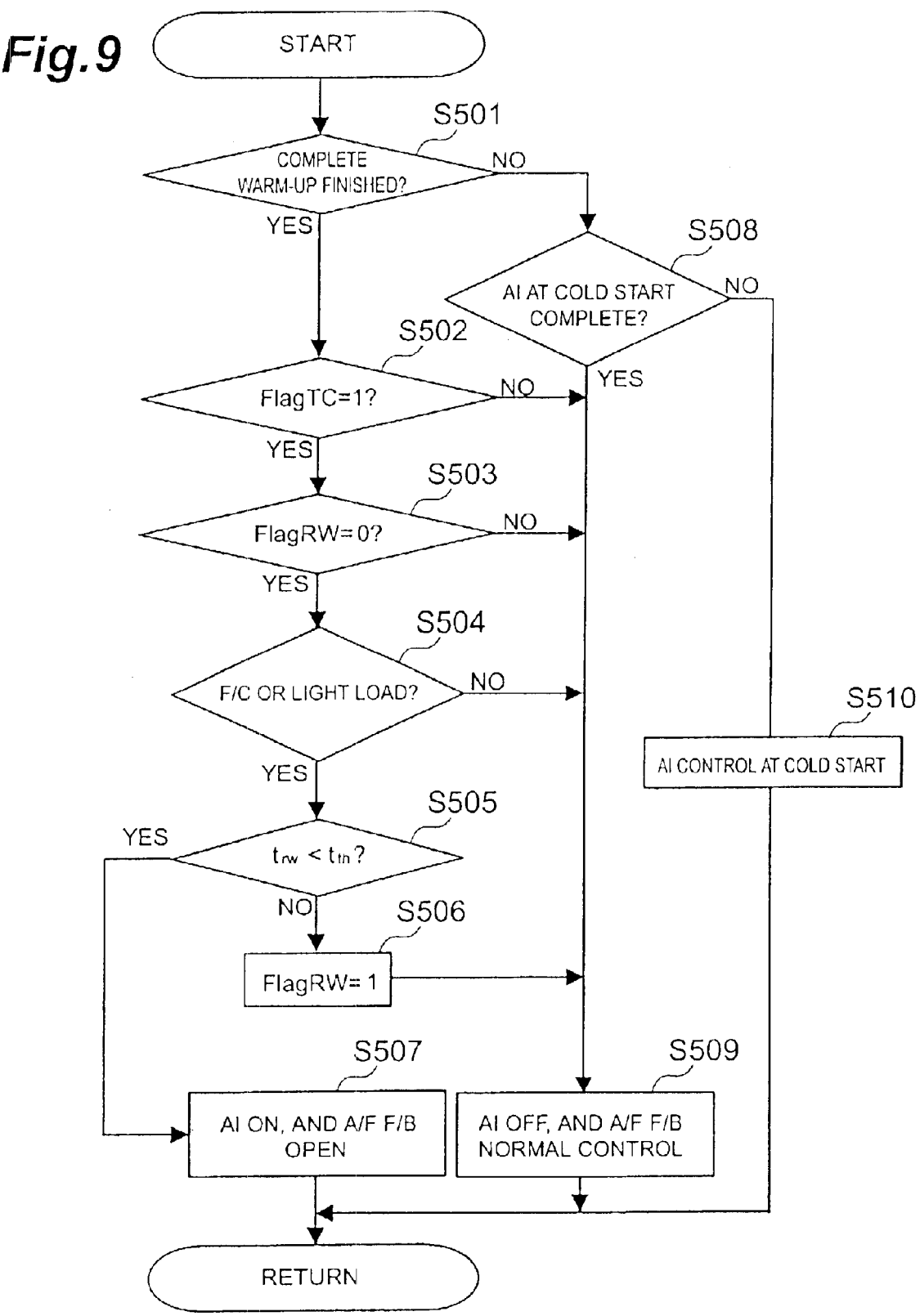
FIG. 9 is a main flowchart of a first control method of condensed water discharge control in the apparatus of FIG. 1.
Figure 10:
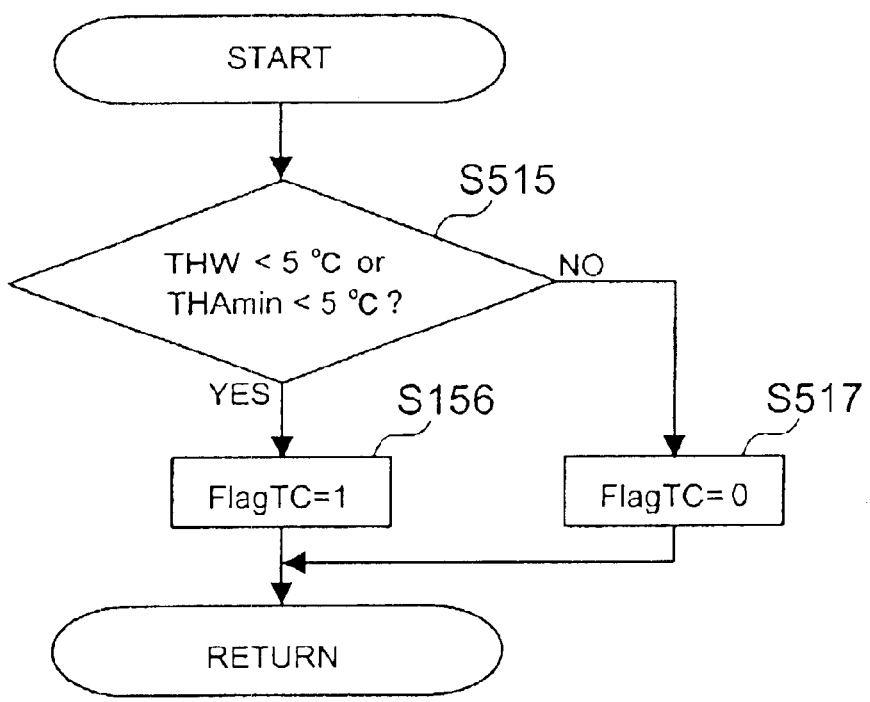
FIG. 10 is a flowchart showing a setting process of a low temperature flag FlagTC used therein.

FIG. 9 shows a main flowchart of a first discharge control method and FIG. 10 a flowchart showing a process of setting a low temperature flag FlagTC used in this control method. This control method is mainly performed by the control unit 10 in cooperation with the engine ECU 23 and is repeatedly executed at predetermined timing from start to stop of the engine 2.

First step S501 is to determine whether a complete warm-up is finished, based on the engine cooling water temperature THW obtained by the cooling water temperature sensor 28. If a predetermined time or more has not elapsed yet since the complete warm-up, i.e., since THW became over a predetermined temperature, the process transfers to step S508 to determine whether the control of auxiliary air injection (AI) at cold starting is complete. Unless it is complete, the process transfers to step S510 to execute the AI control at cold starting. When it is complete on the other hand, the process moves to step S509 to turn the auxiliary air supplying system off. Specifically, the control unit 10 stops AP 12 and closes ASV 13. Then the air/fuel ratio (A/F) is controlled by normal feedback (F/B) control.

When it is determined at step S501 that the complete warm-up is finished, the process goes to step S502 to check the value of low temperature flag FlagTC. This FlagTC is set by a routine shown in FIG. 10. Namely, step S515 is to determine whether the condition that either the engine cooling water temperature THW or the minimum intake air temperature THAmin is less than 5° C., is met. When the condition is met, the process moves to step S516 to set 1 in the value of FlagTC. When the condition is not met, the control unit 10 sets 0 in the value of FlagTC.

When the value of FlagTC thus set is 0, the control unit determines that there is no possibility of freezing, and then the process transfers to step S509, without execution of the condensed water discharge control. When the value of FlagTC is 1 on the other hand, the control unit determines that there is a possibility of freezing, and then the process transfers to step S503. Step S503 is to check the value of FlagRW indicating completion of the condensed water discharge control. When FlagRW is 1, the control unit determines that the condensed water discharge is complete, and then the process transfers to step S509, without execution of the discharge control. When FlagRW is 0, the control unit determines that the condensed water discharge has to be carried out, and then the process transfers to step S504.

Step S504 is to check the operating condition of the engine 2. When the engine 2 is operated in a fuel cut state or a light load state, the control unit determines that the condition for execution of the condensed water discharge control is met, and then the process transfers to step S505. In the cases other than it, if the auxiliary air supply described hereinafter is performed for the condensed water discharge control, the TWC performance will degrade to raise the possibility of the degradation of emission. Therefore, the process transfers to step S509, without execution of the discharge control.

Step S505 is to compare a continuation time $t_{rw}$ of the condensed water discharge control described later, with a threshold $t_{th}$. When $t_{rw}$ is less than $t_{th}$, the process goes to step S507 to turn the auxiliary air supplying system on and cancel the F/B control of A/F. Specifically, ASV 13, if closed, is opened and AP 12, if at a halt, is activated to pass air through the auxiliary air inlet line 11 to effect purge, thereby discharging the remaining condensed water to the exhaust pipe 21 side.

When it is determined at step S505 that $t_{rw}$ is not less than $t_{th}$, which is a time enough for the condensed water discharge to be completed, the process transfers to step S506 to set 1 indicating completion of discharge, in FlagRW, and then moves to step S509 to stop AP 12 and close ASV 13, thereby setting the auxiliary air supplying system off.

As described above, in the case where there is the possibility of freezing in the auxiliary air supplying system 1, the forced purge of the interior of the auxiliary air inlet line 11 is performed after the complete warm-up of the engine 2 to prevent water from remaining in the auxiliary air inlet line 11 because of back flow from the exhaust or the like, thereby suppressing the freezing failure which can be caused by freezing of condensed water in the auxiliary air supplying system 1 during the halt of the engine 2.

Figure 11:
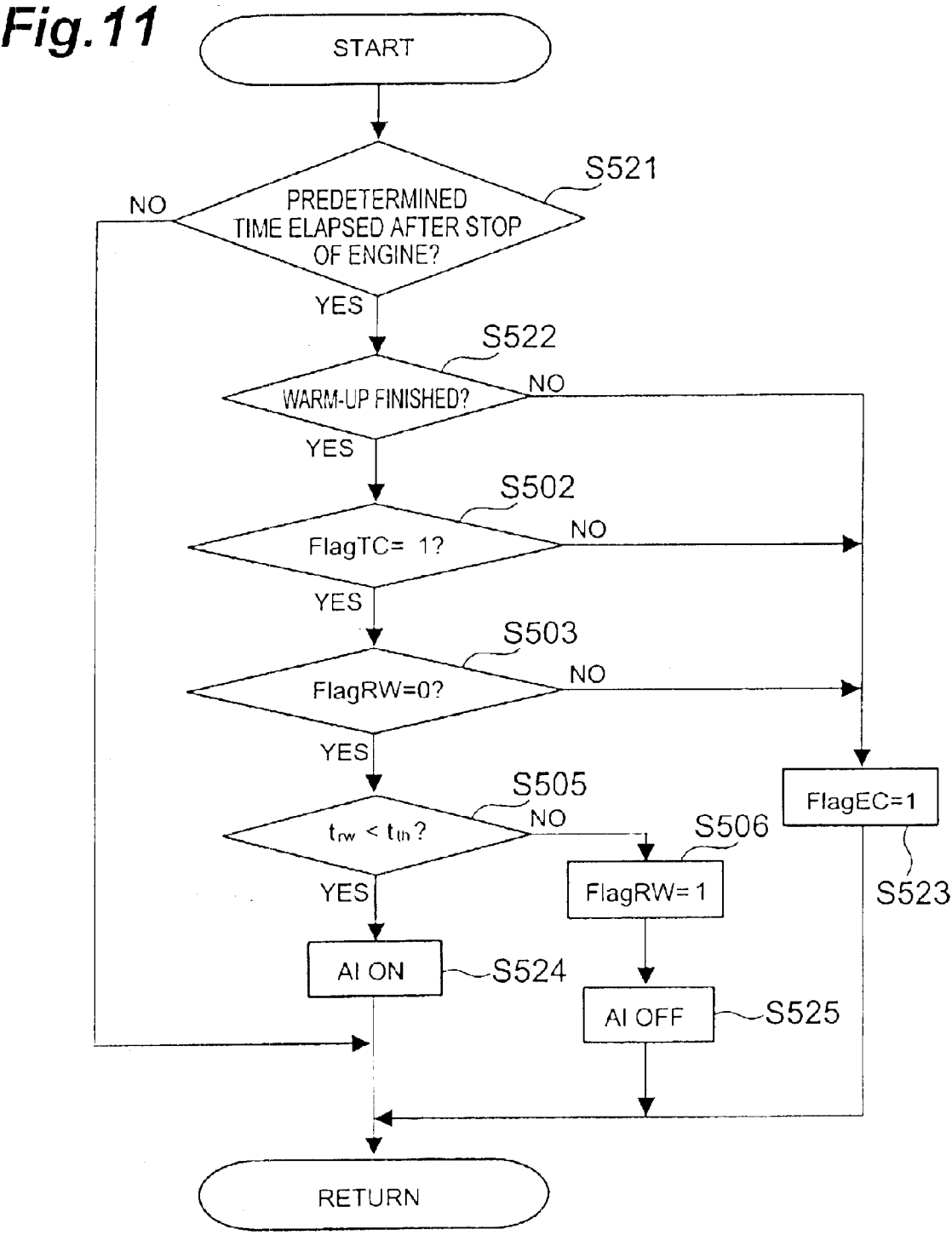
FIG. 11 is a main flowchart of a second control method of condensed water discharge control in the apparatus of FIG. 1.

FIG. 11 is a main flowchart of a second condensed water discharge control method. This control method is mainly performed by the control unit 10 in cooperation with the engine ECU 23, as the first discharge control method was, but is different from the first discharge control method in that the control is repeatedly carried out at predetermined timing after the stop of the engine 2 and before setting of FlagEC at 1.

First step S521 is to check whether a predetermined time has elapsed since a stop of the engine 2. When the predetermined time has not elapsed yet since the stop of the engine, the control unit determines that there is a possibility of exhaust gas remaining in the exhaust pipe 21, and thus ends the processing without execution of processing (in practice, this process is repeated to stand by before the lapse of the predetermined time). After the predetermined time has elapsed since the stop of the engine, the process transfers to step S522 to check whether the engine 2 was stopped after a warm-up. When the stop was not done after the warm-up, the process transfers to step S523 to set 1 in FlagEC, and then ends the processing. In this case, the condensed water discharge control is not executed.

The processing of step S502 to steps S524, S525 is basically the same as in the first discharge control method shown in FIG. 9. Since the present control method is performed after the stop of the engine 2, it is impossible to perform the combustion control of the engine 2 at steps S507, S509 in the first exhaust control method, and steps S524, S525 are thus executed instead thereof. In addition, step S504 of checking the operating condition of the engine is excluded. When there is the possibility of freezing, the process transfers to step S524 to turn the AI system on to effect a forced purge. After a lapse of a sufficient time since the start of the purge, the process goes to step S525 to turn the AI system off to end the purge.

Since the present discharge control method is configured to perform the forced purge of the interior of the auxiliary air inlet line 11 after the stop of the engine 2, it is feasible to securely discharge the water deriving from the exhaust gas or the like remaining in the line 11. Accordingly, it is feasible to adequately decrease the possibility of occurrence of the freezing failure at the next start. Since the purge is not performed immediately after the stop of the engine but is performed after the lapse of the fixed time, it is feasible to securely discharge the water condensed in the pipe because of cooling of the auxiliary air inlet line 11. Furthermore, since the discharge control method is performed in the engine stop state, the operation of the auxiliary air supplying system will never worsen the emission.

Figure 12:
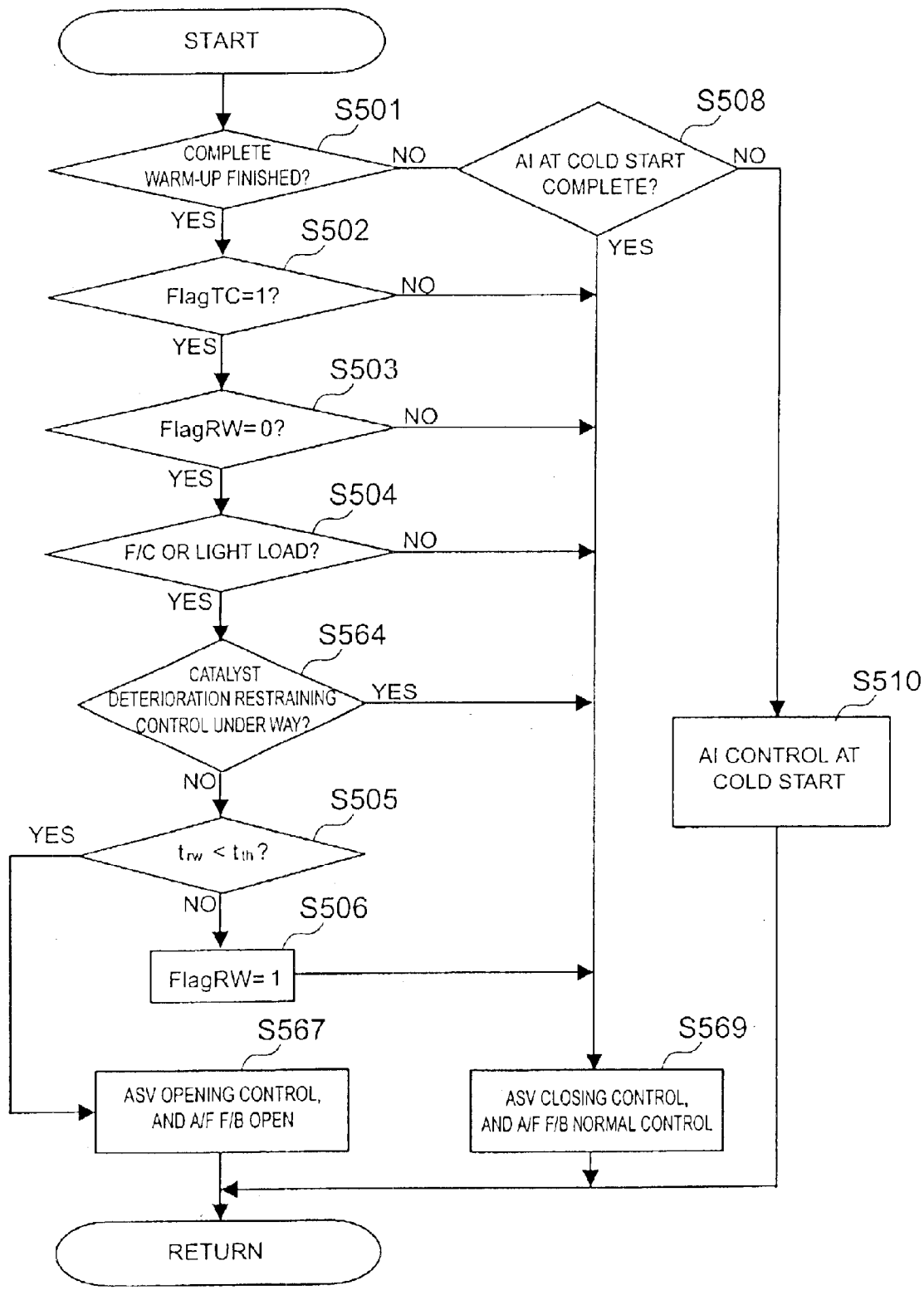
FIG. 12 is a main flowchart of a third control method of condensed water discharge control in the apparatus of FIG. 1.

FIG. 12 is a flowchart of a third discharge control method. The present discharge control method is similar to the first discharge control method, but is different in that the first discharge control method was configured to perform the forced driving of the AI system to effect the purge of the auxiliary air inlet line 11, whereas the present discharge control method is configured to open only ASV 13 to effect the purge, without actuation of AP 12.

Specifically, as shown in FIG. 12, processing of steps S567, S569 is performed instead of steps S507, S509 in the flowchart shown in FIG. 9, and processing of step S564 is inserted between step S504 and step S505.

Namely, step S567 is to open ASV 13 and cancel the F/B control of A/F while keeping AP 12 at a standstill, different from the driving of the AI system at step S507. This opens the auxiliary air inlet line 11 to help part of air through the air filter 25 to be introduced through the auxiliary air inlet line 11 into the exhaust pipe 21 by air suction, so as to effect the purge of the interior of the auxiliary air inlet line 11, thereby discharging the remaining condensed water to the exhaust pipe 21.

The other step S569 is substantially similar to step S509 and is to close ASV 13 to interrupt the auxiliary air inlet line 11 while maintaining AP 12 at a standstill, and execute the F/B control of A/F.

Step S564 is to determine whether catalyst deterioration restraining control is under way. When the exhaust gas passing through the TWC 22 has a lean air/fuel ratio, i.e., is in an excessive oxygen state, storage of NOx and oxidation of CO and HC is accelerated. If it is done with the TWC 22 being in a hot state, the catalyst will tend to deteriorate because of overheat. Therefore, the catalyst deterioration restraining control is performed to prohibit the fuel cut to prevent the air/fuel ratio of exhaust gas from becoming too lean (i.e., to prevent the oxygen content from becoming too high). If during this control the purge of the auxiliary air supplying system is carried out, the auxiliary air supplied by the purge will make the air/fuel ratio of exhaust gas leaner to increase the oxygen content, so that the catalyst deterioration restraining control becomes substantially null. Therefore, it is necessary to prohibit the purge during this control. When the control is under way, the process thus goes to step S569 to perform no purge. Only when the control is not under way, the process proceeds through step S505 to step S567 to permit a purge.

The first discharge control method has high water removing performance on one hand but increases the operating time of AP 12 on the other hand, which requires improvement in durability thereof. Since a large volume of auxiliary air is supplied, the air/fuel ratio of exhaust gas tends to become overlean, and thus the emission amount of NOx tends to become worse. Since the present discharge control method is configured to perform no forced purge, no excessive auxiliary air is supplied, so as to prevent the overlean A/F and the increase in the operating time of AP 12. Therefore, the present discharge control method can be substantiated by the currently available durability level of AP.

In the first discharge control method, it is also preferable to prohibit the purge during the catalyst deterioration restraining control as in the present embodiment. The amount of auxiliary air supply tends to become excessive in the case of the purge by the actuation of AP 12, and thus the prohibition of purge is particularly effective in that case.

Figure 13:
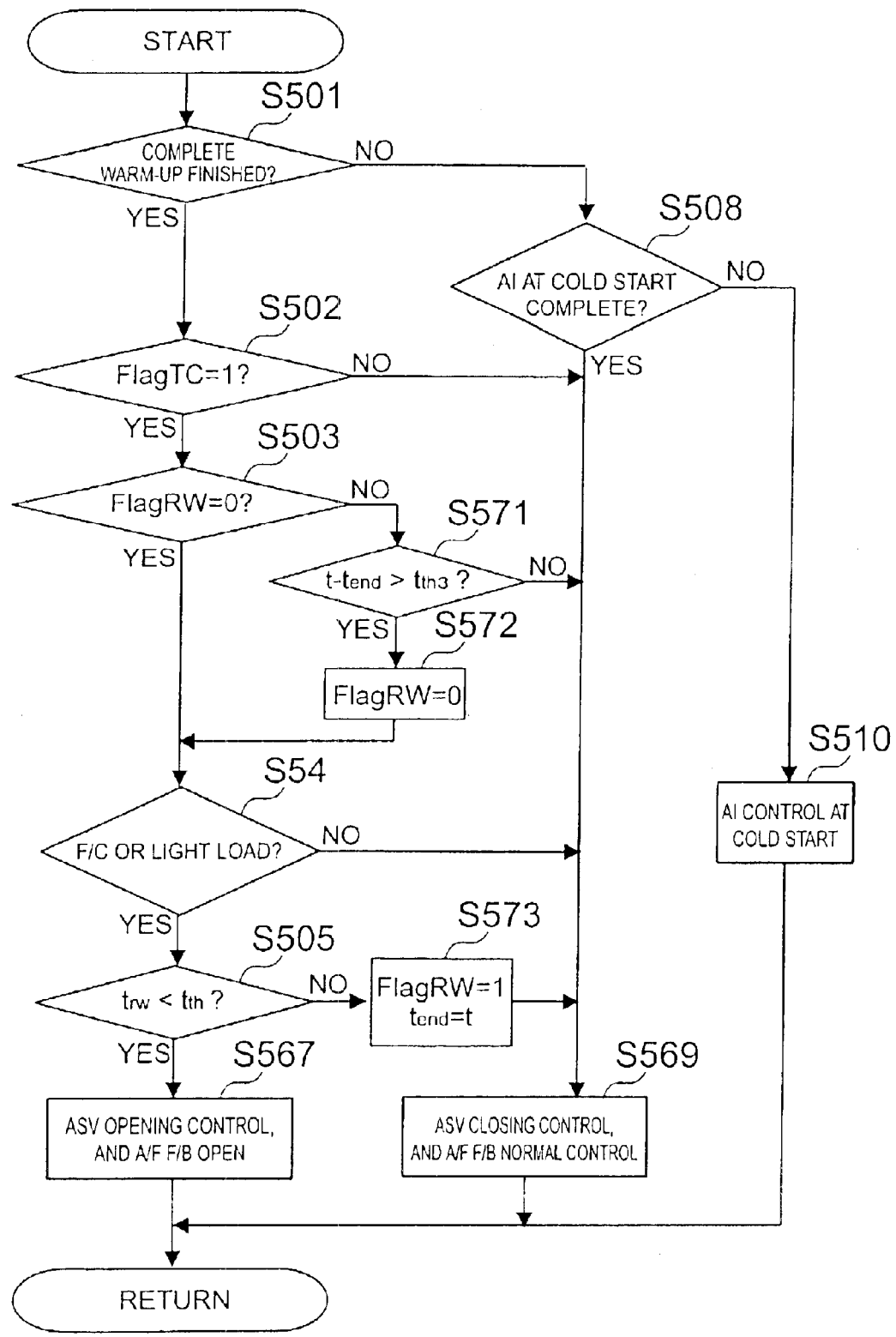
FIG. 13 is a main flowchart of a fourth control method of condensed water discharge control in the apparatus of FIG. 1.

FIG. 13 is a flowchart of a fourth discharge control method. The present discharge control method is a modification of the third discharge control method, but the discharge prohibiting control during the catalyst deterioration restraining control is excluded in order to simplify the description. It is a matter of course that it is preferable to provide the present control method with the discharge prohibiting control during the catalyst deterioration restraining control. Furthermore, the present discharge control method is different from the third discharge control method in that steps S571, S572 are placed between step S503 and step S569 and step S573 is provided instead of step S506.

In the present control method, when at step S573 the completion flag of condensed water discharge control FlagRW is set to 1, a time t of the setting moment is stored in a variable $t_{end}$. Step S571 is to compare a difference $(t-t_{end})$ between $t_{end}$ thus set and the current time t, i.e., a passing time since the end of the purge, with a threshold $t_{th3}$. When the comparison result is NO, i.e., when the sufficient time has not elapsed since the previous purge, the control unit goes to step S569 to close ASV 13 to maintain the auxiliary air inlet line 11 in the interrupted state and perform the normal F/B control of A/F.

On the other hand, after the sufficient time has elapsed since the previous purge, the control unit resets FlagRW to 0 (step S572), thereafter returns to step S504, and then goes to step S567 to execute a purge of the auxiliary air inlet line 11 again.

This results in executing the purges of the auxiliary air inlet line 11 at intervals of the fixed time, so that it is feasible to effectively remove the condensed water remaining in the auxiliary air inlet line 11 after the warm-up. As a result, it enhances the effect of restraining the blockage of the auxiliary air supply line due to freezing of condensed water remaining in the auxiliary air inlet line 11, at restarting.

The processing routines in the respective discharge control methods described above are just examples and a variety of modifications can be made therein. For example, the sequence of determinations can be changed as long as the result of processing is the same. It is also needless to mention that modifications achieved by partial combination of the discharge control methods described above are also embraced in the scope of the present invention.

Figure 14:
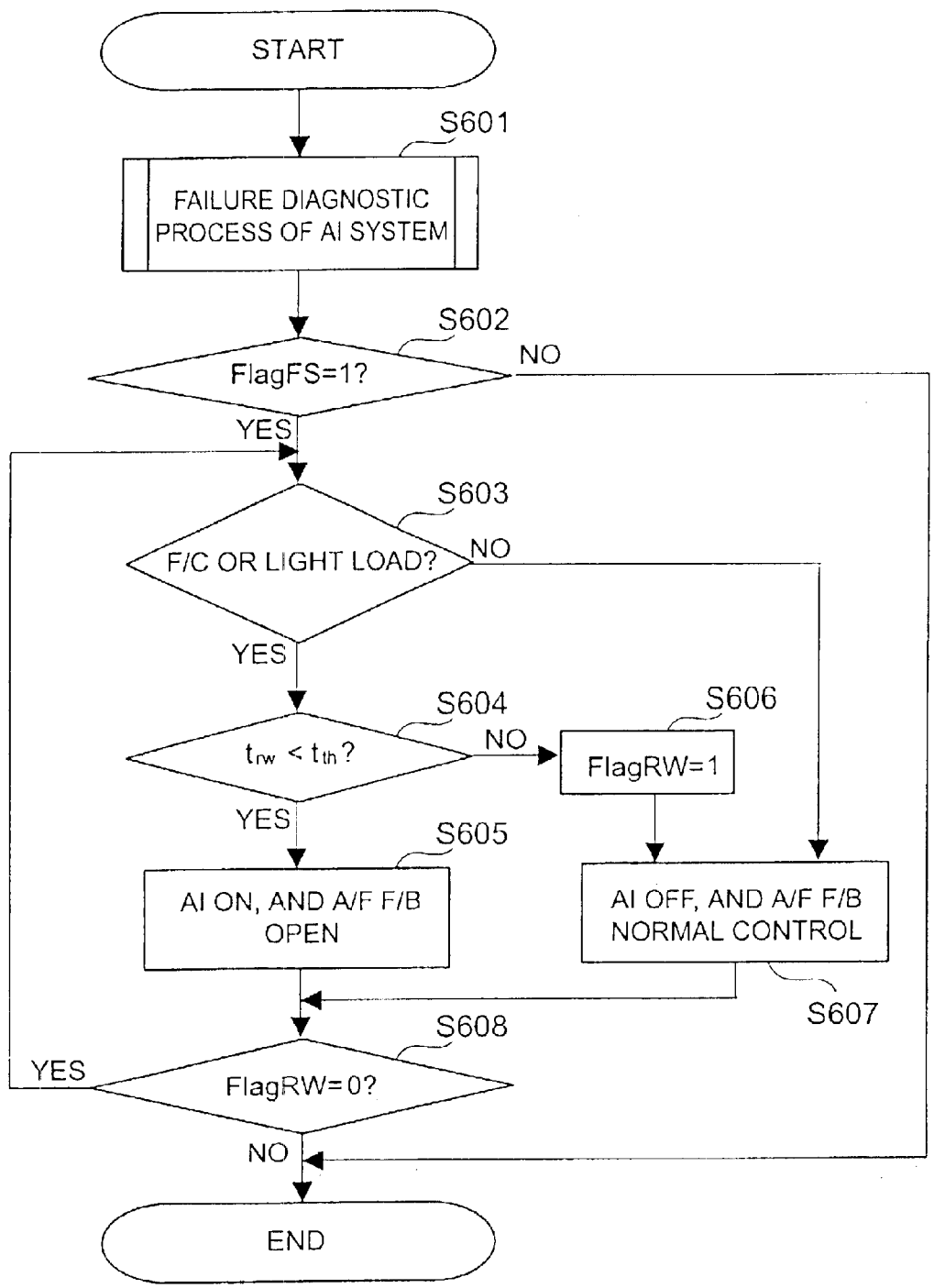
FIG. 14 is a main flowchart of a first embodiment of combinational control in the system of FIG. 1, and FIG. 15 a flowchart showing a setting process of a freezing failure flag FlagFS used therein.
Figure 15:
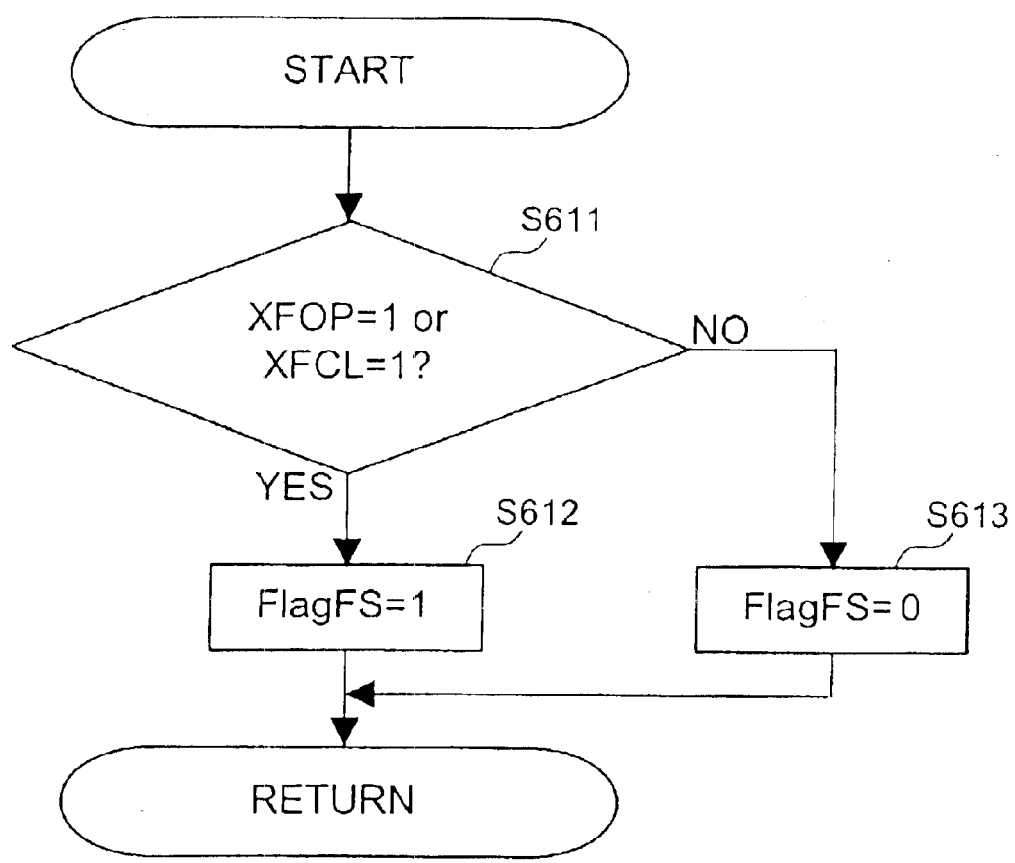

The following will describe combinational control of the aforementioned failure diagnosis with the condensed water discharge control. FIG. 14 is a flowchart showing a first embodiment of such combinational control, and FIG. 15 a flowchart showing a setting process of a freezing failure flag FlagFS used in this control method. The present control is mainly performed by the control unit 10 in cooperation with the engine ECU 23, as each of the control methods described above was, and is executed only once after starting of the engine 2.

In the present embodiment, first step S601 is to carry out a failure diagnostic process. This failure diagnostic process is the same as the aforementioned failure diagnostic method and, specifically, it is executed based on the flowchart shown in FIG. 2. Subsequent step S602 is to check the value of the freezing failure flag FlagFS. This FlagFS is set by a routine presented in FIG. 15. Specifically, step S611 is to check the freezing open anomaly flag XFOP or the freezing closure anomaly flag XFCL set by the freezing failure determination at starting (step S601), and determine whether the condition that either flag is 1 is met. When the condition is met, the process transfers to step S612 to set 1 in the value of FlagFS. When the condition is not met, the process goes to step S613 to set 0 in the value of FlagFS.

When the value of FlagFS is 0, the control unit determines that there was no freezing failure at starting and, in this case, the process skips the subsequent processing and ends the processing. Since the value of FlagFS of 1 indicates that it was determined that there was a failure due to freezing, the process moves in that case to step S603 in order to securely discharge the condensed water.

Step S603 is to check the operating condition of the engine 2. When the engine 2 is operated in the fuel cut state or the light load state, the control unit determines that the condition for execution of the condensed water discharge control is met, and then goes to step S604. In the cases other than it, if the auxiliary air supply described hereinafter is performed for the condensed water discharge control, the catalyst performance will degrade, so as to raise the possibility of degradation of emission, and thus the process goes to step S607 described below, without transferring to the condensed water discharge control.

Step S604 is to compare the continuation time $t_{rw}$ of condensed water discharge control with the threshold $t_{th}$. When $t_{rw}$ is less than $t_{th}$, the process goes to step S605 to turn the auxiliary air supplying system on and cancel the F/B control of A/F. Specifically, the control unit opens ASV 13 if closed and actuates AP 12 if at a standstill, so as to pass air through the auxiliary air inlet line 11 to effect purge, thereby discharging the remaining condensed water to the exhaust pipe 21 side.

When it is determined at step S604 that $t_{rw}$ is not less than $t_{th}$ being a time enough for the condensed water discharge to be completed, the process goes to step S606 to set 1 indicating completion of discharge, in the discharge control completion flag FlagRW, and then goes to step S607 to stop AP 12 and close ASV 13 to turn the auxiliary air supplying system off.

After completion of step S605 or S607, the process moves to step S608 to evaluate the value of the discharge control completion flag FlagRW. When the value is 1, i.e., when the discharge control is complete, the control unit 10 ends the processing. When the value is 0, i.e., when the discharge control is unended, the process returns to step S603. This makes it feasible to securely discharge the condensed water if there is a freezing anomaly.

The above described the example in which the forced purge was done by actuation of AP 12, but it is also possible to implement only natural purge by opening control of ASV 13 as described in the third discharge control method (cf. FIG. 12). It is also preferable to prohibit the purge control during the catalyst deterioration restraining control as in the third discharge control method (cf. FIG. 12).

Figure 16:
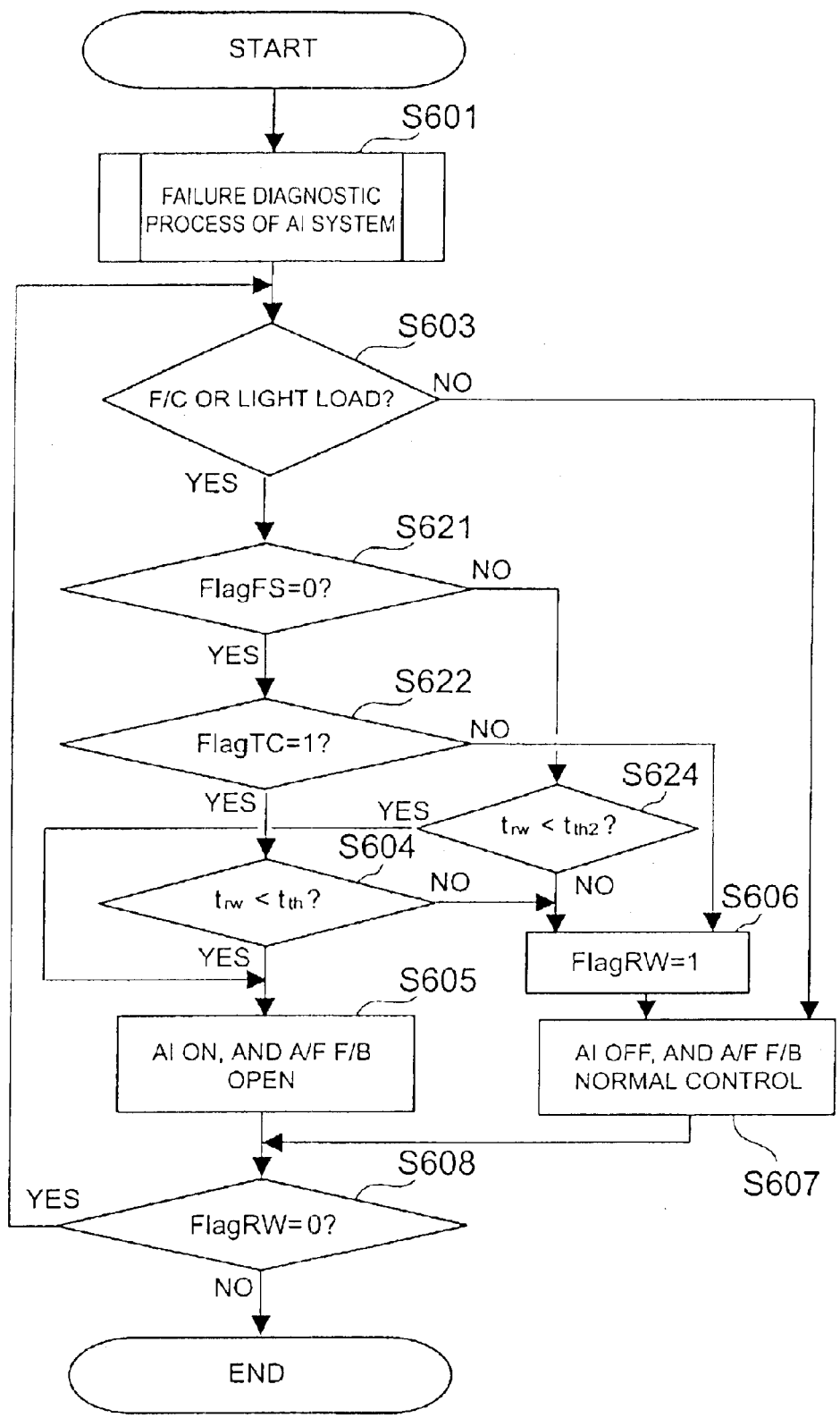
FIG. 16 is a main flowchart of a second embodiment of combinational control in the apparatus of FIG. 1, FIG. 17 a graph showing a setting example of thresholds $t_{th}$, $t_{th2}$ for a continuation time of condensed water discharge control against outside air temperature Td, and FIG. 18 a graph showing another setting example of the thresholds $t_{th}$, $t_{th2}$ for the continuation time of condensed water discharge control against outside air temperature Td.

The discharge control may be modified according to freezing states. FIG. 16 is a main flowchart showing a second embodiment of combinational control. This control method is also mainly performed by the control unit 10 in cooperation with the engine ECU 23, as the first embodiment was, and it is executed only once after starting of the engine 2.

Since the process of the first step S601 is the same as in the first embodiment, the detailed description thereof is omitted herein. After completion of the failure diagnostic process at step S601, the process transfers directly to step S603, different from the first embodiment. When it is determined at step S603 that the engine 2 is not in the F/C or light load state, the process moves to step S607, as in the case of the first embodiment.

On the other hand, when it is determined at step S603 that the engine 2 is in the F/C or light load state, the process transfers to step S621 to evaluate the value of FlagFS. When the value of FlagFS is 0, i.e., when there was no freezing anomaly at starting, the process transfers to step S622 to check the value of the low temperature flag FlagTC. This process is equivalent to the process of step S502 in the first discharge control method (cf. FIGS. 9 and 10). When the value of FlagTC is 0, the control unit 10 determines that there is no risk of freezing, and then the process transfers to step S606 described hereinafter, to end the processing, without execution of the condensed water discharge control.

When the value of FlagTC is 1 on the other hand, the control unit 10 determines that there is a risk of freezing, and then the process transfers to step S604. Step S604 is to compare the continuation time $t_{rw}$ of the condensed water discharge control with the threshold $t_{th}$. When $t_{rw}$ is less than $t_{th}$, the process transfers to step S605 to turn the auxiliary air supplying system on and cancel the F/B control of A/F. Specifically, the control unit 10 opens ASV 13 if closed and actuates AP 12 if at a standstill, so as to pass air through the auxiliary air inlet line 11 to effect purge, thereby discharging the remaining condensed water to the exhaust pipe 21 side.

When it is determined at step S604 that $t_{rw}$ is not less than $t_{th}$ being a time enough for the condensed water discharge to be completed, the process goes to step S606 to set 1 indicating completion of discharge, in FlagRW, and then moves to step S607 to stop AP 12 and close ASV 13 to turn the auxiliary air supplying system off.

On the other hand, when at step S621 the value of FlagFS is 1, i.e., there occurs a freezing anomaly at starting, the process goes to step S624 to compare the continuation time $t_{rw}$ of the condensed water discharge control with the threshold $t_{th2}$. Here the threshold is set to satisfy $t_{th}<t_{th2}$. When $t_{rw}$ is less than $t_{th2}$, the process transfers to step S605. When $t_{rw}$ is not less than $t_{th2}$, the process transfers to step S606. This process results in performing forced purge of the interior of the auxiliary air inlet line 11 for a longer time than in the case of FlagFS being 0 and FlagTC being 1. In this control, the forced purge is performed for the longer time in the case of the temporary failure due to freezing having already been detected, than in the other cases, whereby the condensed water is securely discharged, so as to suppress occurrence of failure at the next start.

After completion of either step S605 or 5607, the process goes to step S608 to evaluate the value of FlagRW. When the value is set at 1 indicating completion of discharge control, the control unit 10 ends the processing. When the value is set at 0 indicating incompletion, the process returns to step 5603, so as to permit secure purge with the engine 2 in the F/C or light load state.

Figure 17:
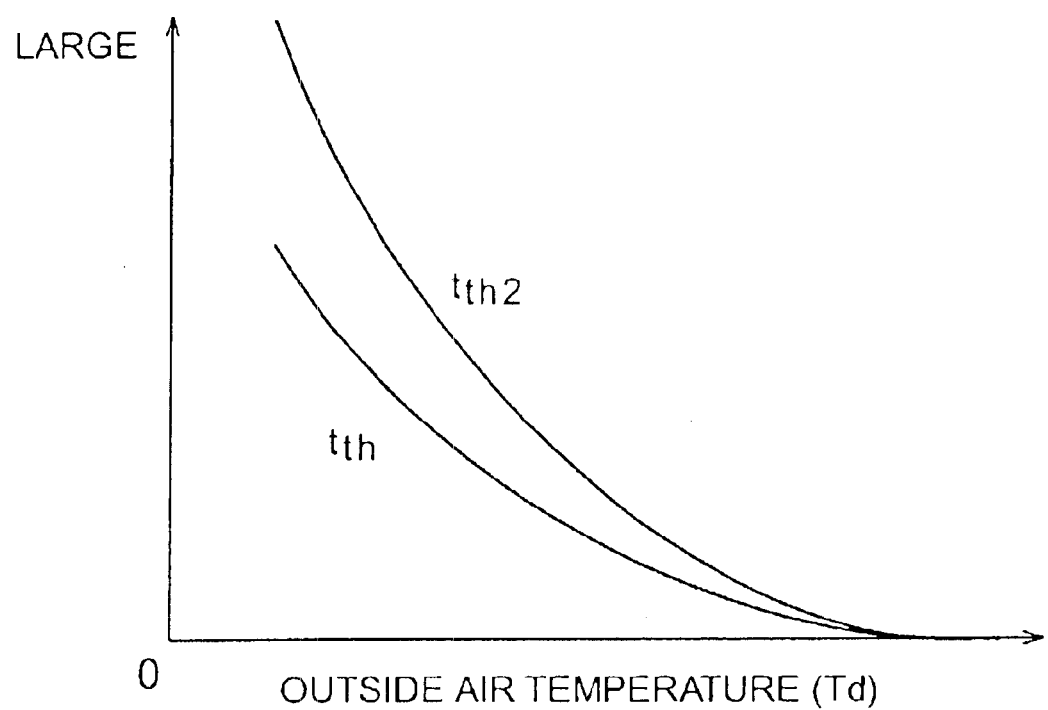
Figure 18:
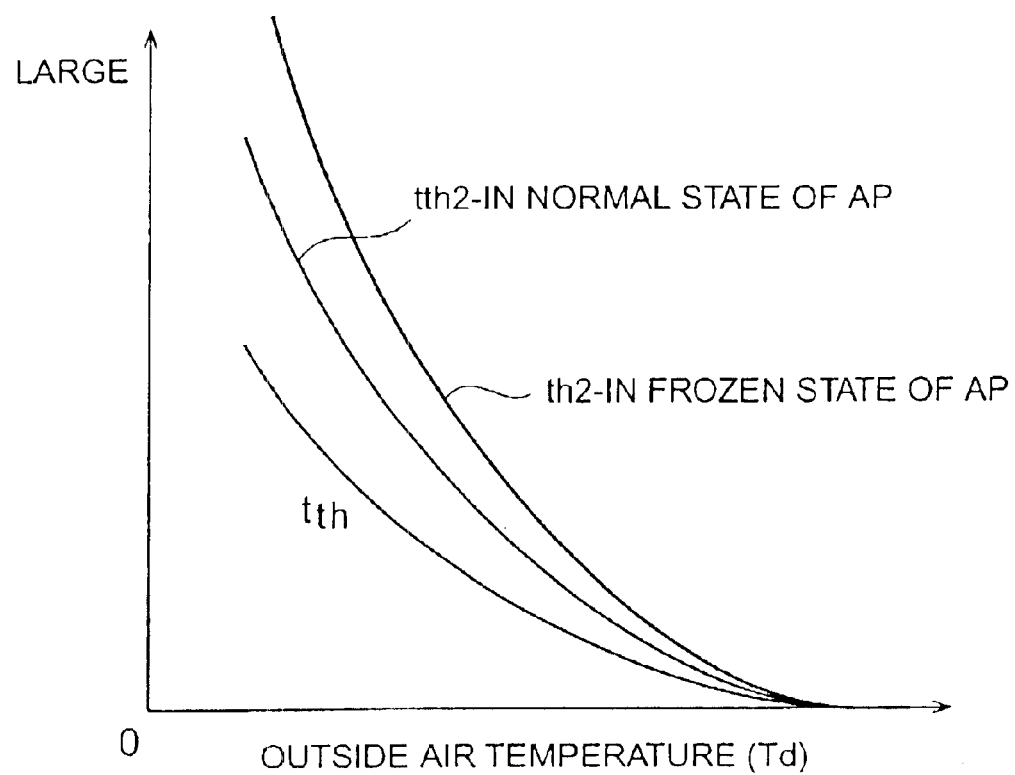

The thresholds $t_{th}$, $t_{th2}$ for the continuation time of the condensed water discharge control may be constant values, but it is preferable to increase the thresholds with decrease in the outside air temperature Td, as shown in FIG. 17, so as to lengthen the time of purge. Furthermore, as shown in FIG. 18, it is preferable to set the threshold $t_{th2}$ larger with a determination of a temporary failure due to freezing of AP 12 than with a determination of a temporary failure due to freezing of other ASV 13 or RV 14, so as to lengthen the time of purge. This is because AP 12 is positioned upstream of ASV 13 and RV 14 on the inlet line 11 and is considered to require a longer time for complete discharge of condensed water in terms of structure than the valves.

Figure 19:
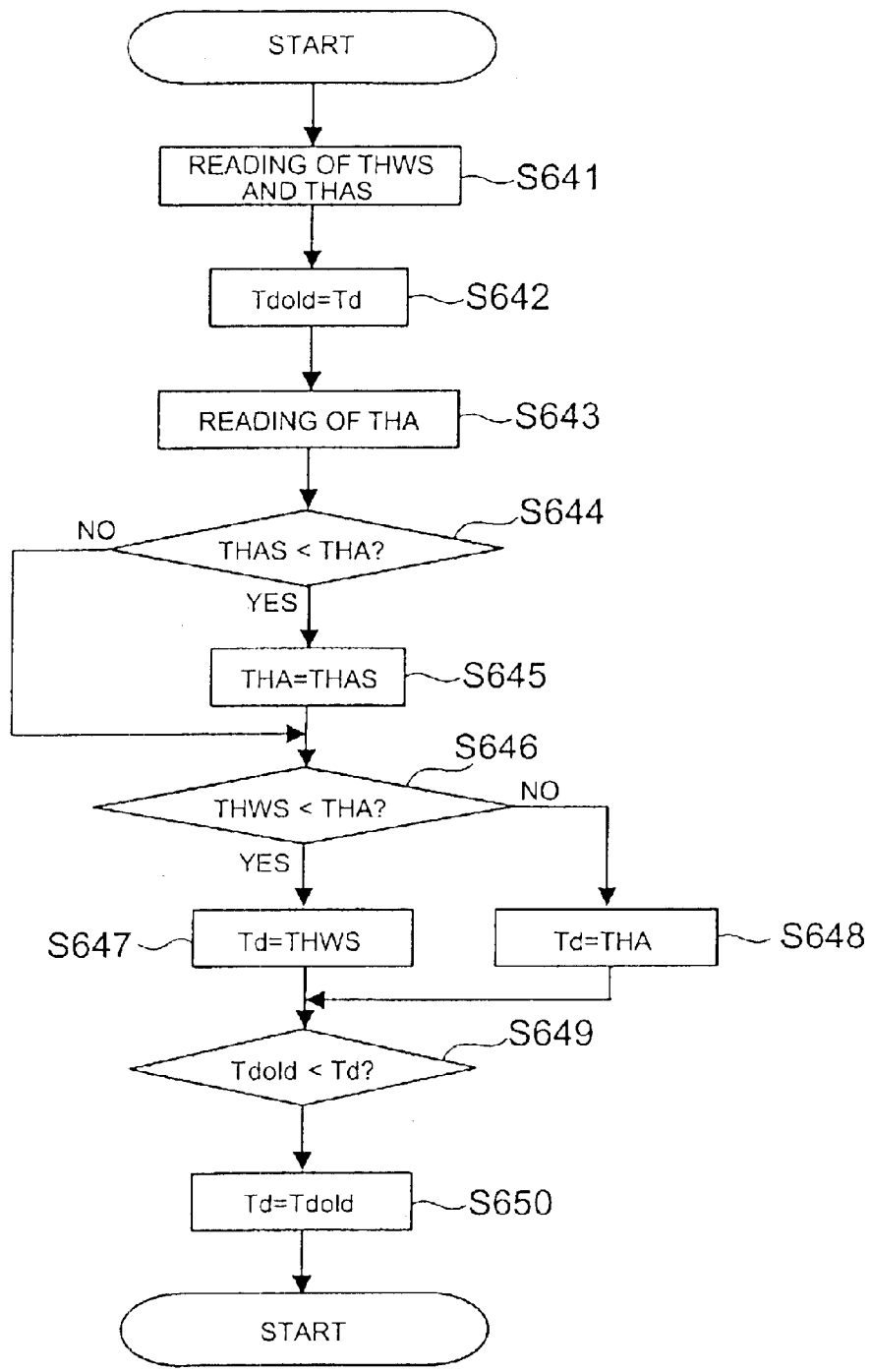
FIG. 19 is a flowchart showing a prediction routine of outside air temperature Td.

The outside air temperature Td may be directly measured by an unrepresented temperature sensor or the like, or the intake air temperature THA may be used in place thereof. In order to ensure the prevention of freezing, it is preferable to use the outside air temperature Td estimated by a routine presented in FIG. 19. Specifically, step S641 is to read the engine cooling water temperature THWS and the intake air temperature THAS at starting, and step S642 is to store the estimated outside air temperature Td at the previous time step, in a variable Tdold. Step S643 is to read the current intake air temperature THA. Steps S644, S645 are to compare THA with THAS and replace THA with THAS if THAS is smaller. Steps S646 to S648 are to compare the set THA with THWS and set the smaller in Td. Steps S649, S650 are to compare Td with Tdold and replace Td with Tdold if Tdold is smaller. This results in setting as Td the lower temperature out of the minimum temperature of the intake air temperature THA from the start to the present time and the engine cooling water temperature at starting THWS, whereby the continuation time of condensed water discharge control can also be adequately secured even with variation in the outside air temperature after starting or even with movement of the vehicle.

Figure 20:
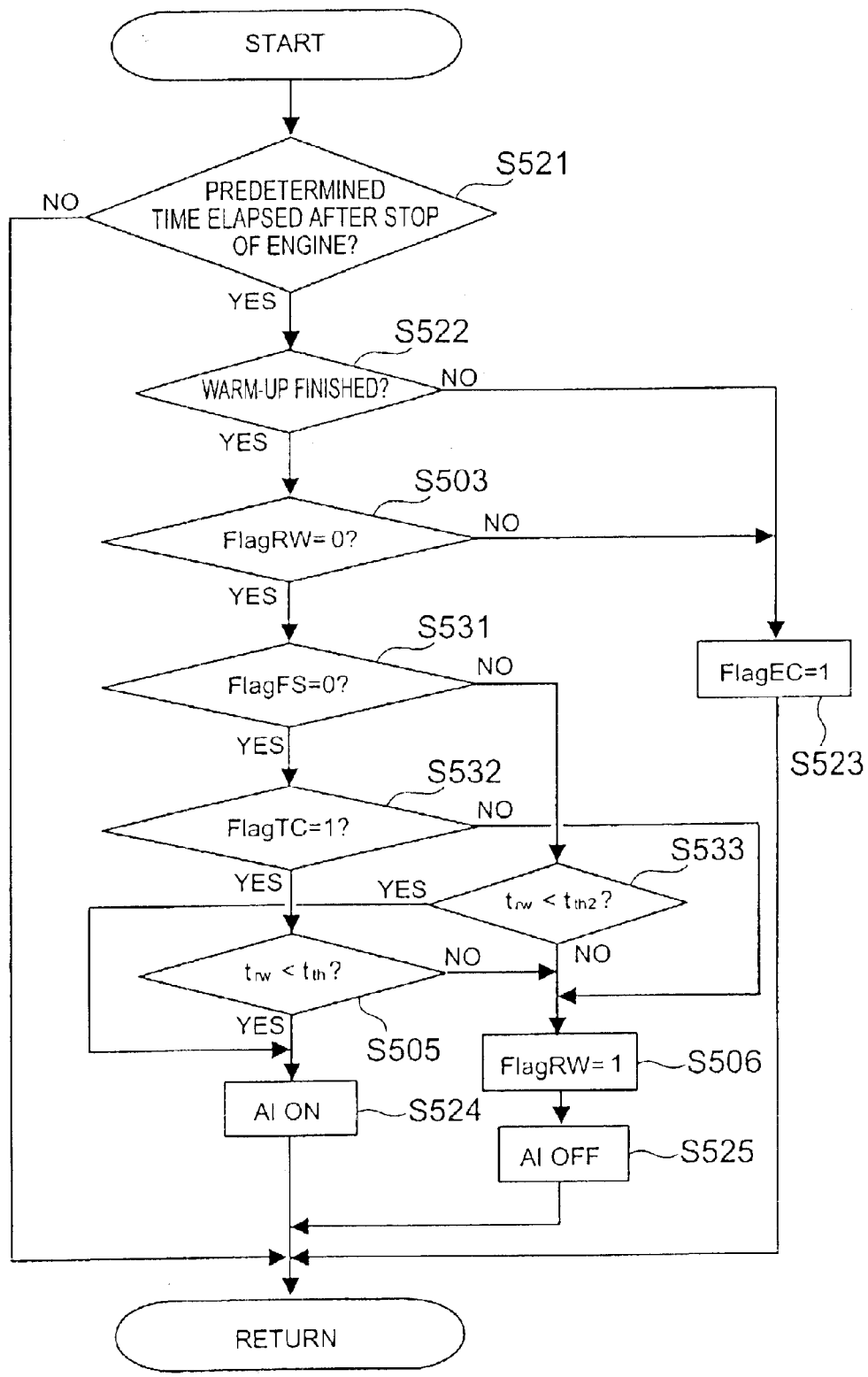
FIG. 20 is a flowchart of a condensed water discharge control part after a halt in a third embodiment of combinational control in the apparatus of FIG. 1.

The above described the examples in which the discharge process was carried out immediately after the failure determination, but it is also possible to employ a configuration of carrying out the discharge process after a lapse of a fixed time for standby since the failure determination, or a configuration of performing the failure determination at starting, stopping the engine with detection of a freezing anomaly, and thereafter carrying out the condensed water discharge control shown in FIG. 11. In these configurations, it is also preferable to adjust the time for purge according to the result of the failure determination. FIG. 20 is a flowchart of a method of adjusting the time for purge after the stop of the engine according to the result of the failure determination in the condensed water discharge control shown in FIG. 11. (This corresponds to the discharge control processing part in the third embodiment of combinational control.)

The processing of steps S521 to S523 is the same as in the condensed water discharge control shown in FIG. 11. The process transfers from step S522 directly to step S503 to check the value of the completion flag of condensed water discharge control FlagRW. When the value of FlagRw is 1, the process transfers to step S523 to set 1 in FlagEC, and then ends the processing. When the value of FlagRW is 0, the process transfers to step S531.

The processing of step S531 to steps S524, S525 is similar to the processing of steps S621 to S605, S607 in the second embodiment of combinational control shown in FIG. 16. Since the present control is performed after the stop of the engine 2, it is different in that it excludes the combustion control of the engine 2 at the steps S605, S607 in the second embodiment of combinational control.

In the present method, in addition to the discharge control shown in FIG. 11, the time for purge is set longer with a freezing anomaly than without it, whereby secure discharge of condensed water can be performed.

Figure 21:
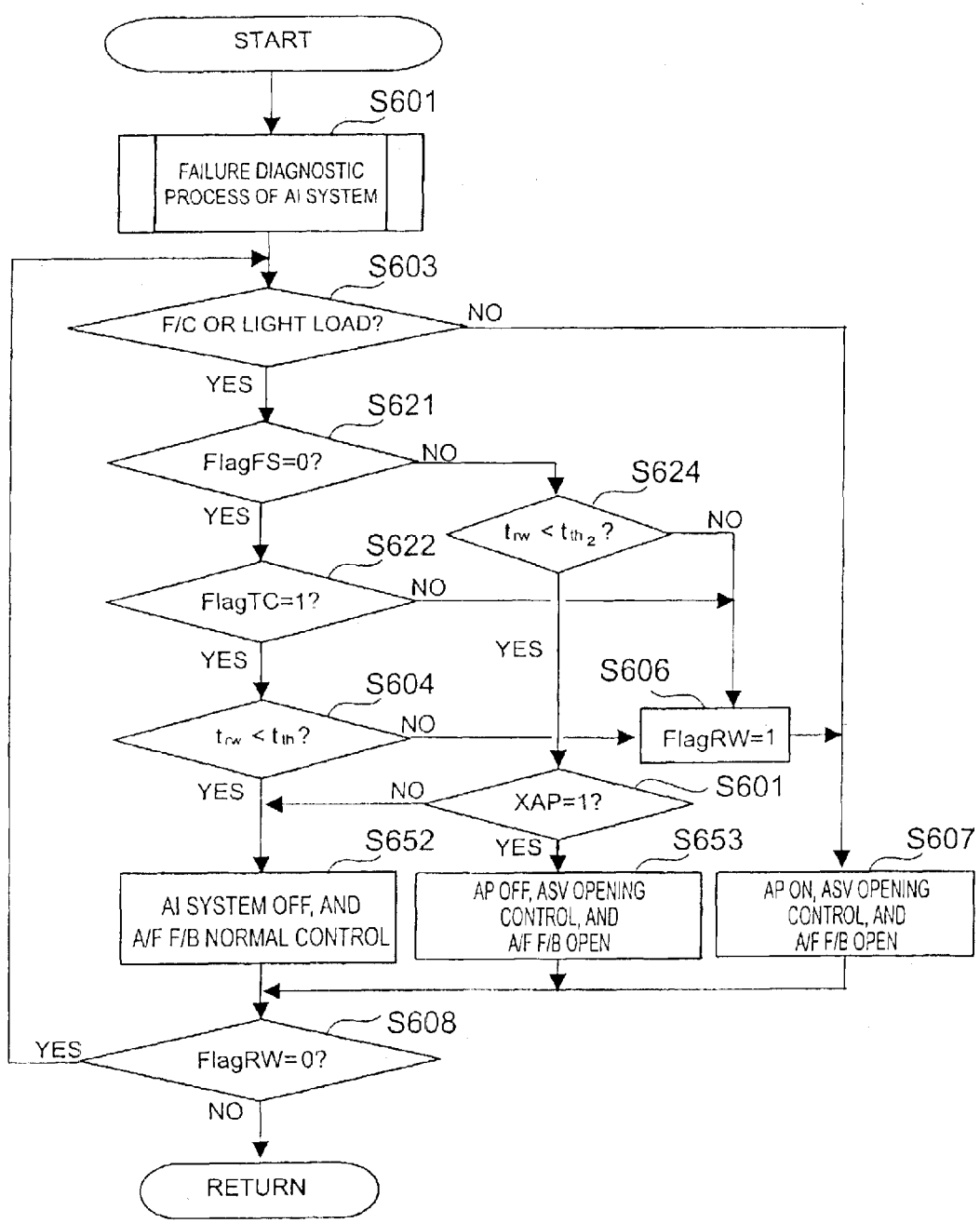
FIG. 21, is a main flowchart of a fourth embodiment of combinational control in the apparatus of FIG. 1.

Furthermore, it is also possible to switch between techniques of discharge control, i.e., between forced purge and natural purge according to probable frozen locations. FIG. 21 is a flowchart of a fourth embodiment of combinational control. The present discharge control method is similar to that in the second embodiment (cf. FIG. 16), but it is different in that the second embodiment was configured to perform the forced driving of the AI system to effect the purge of the auxiliary air inlet line 11, whereas the present embodiment is configured to switch between forced driving of the AI system (to activate AP 12 and open ASV 13) and control to deactivate AP 12 and open ASV 13 according to probable frozen locations.

Specifically, in addition to step S653 of carrying out the forced purge in the same manner as at step S605 in FIG. 16, the present method additionally includes step S652 of carrying out the natural purge and step S651 of checking a failure state of AP 12. In addition, the path from step S604 to S605 is replaced by a path from step S604 via S652 to S608. Step S651 is to determine whether the value of the freezing flag XAP of AP 12 is 1 indicating a freezing anomaly.

Figure 22:
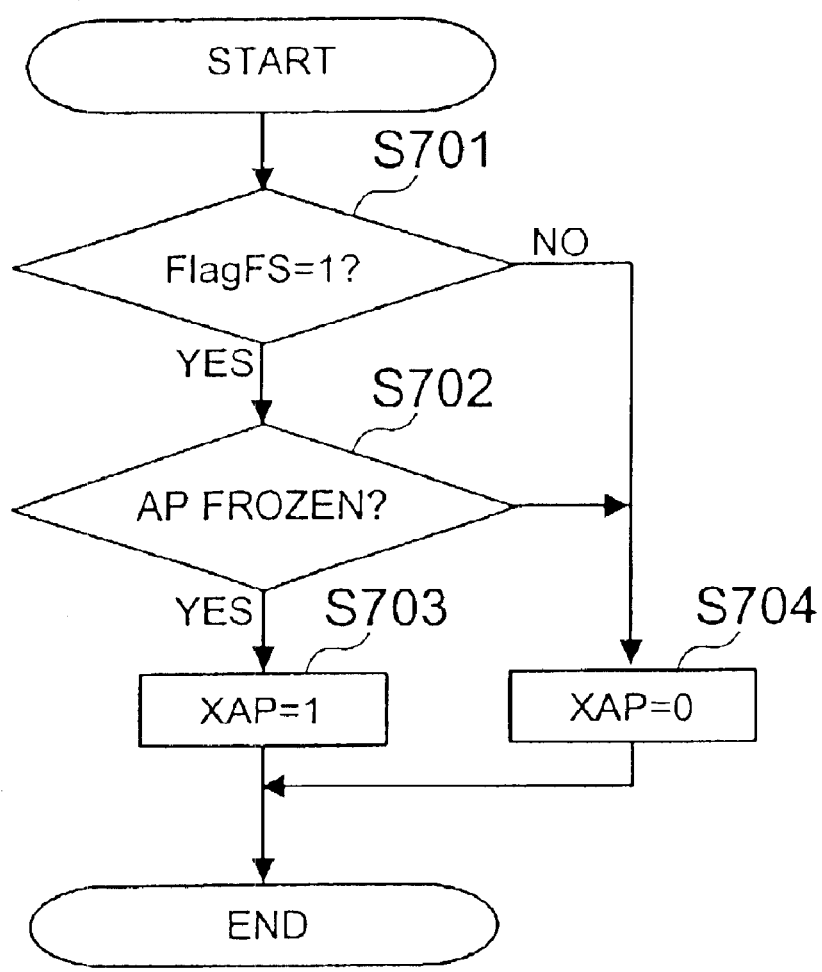
FIG. 22 is a flowchart to explain a setting routine of a flag XAP used therein.

FIG. 22 is a flowchart to illustrate a setting routine of this XAP. Step S701 is to check the value of the freezing flag FlagFS. When the determination result is YES, the control unit then determines whether the failure is a freezing failure of AP 12 (step S702). When it is determined that the failure is a freezing failure of AP 12 (including a freezing failure of the pressure sensor 15), the process goes to step S703 to set 1 in the value of KAP. In the other cases, the control unit sets 0 in the value of XAP at step S704.

When it is determined at step S651 that XAP is 1, it is assumed that there occurs a freezing failure upstream of ASV 13, and thus the process transfers to step S653 to turn the AI system on to implement the forced purge, thereby securely purging the interior of the auxiliary air inlet line 11 in a short time. When it is determined on the other hand that XAP is 0, it is assumed that there occurs a freezing failure downstream of ASV 13, and thus the process transfers to step S652 to open ASV 13 to effect purge by air suction, thereby implementing the discharge of condensed water. This suppresses excessive auxiliary air supply unnecessary for the discharge of condensed water and thus avoids the degradation of emission.

Figure 23:
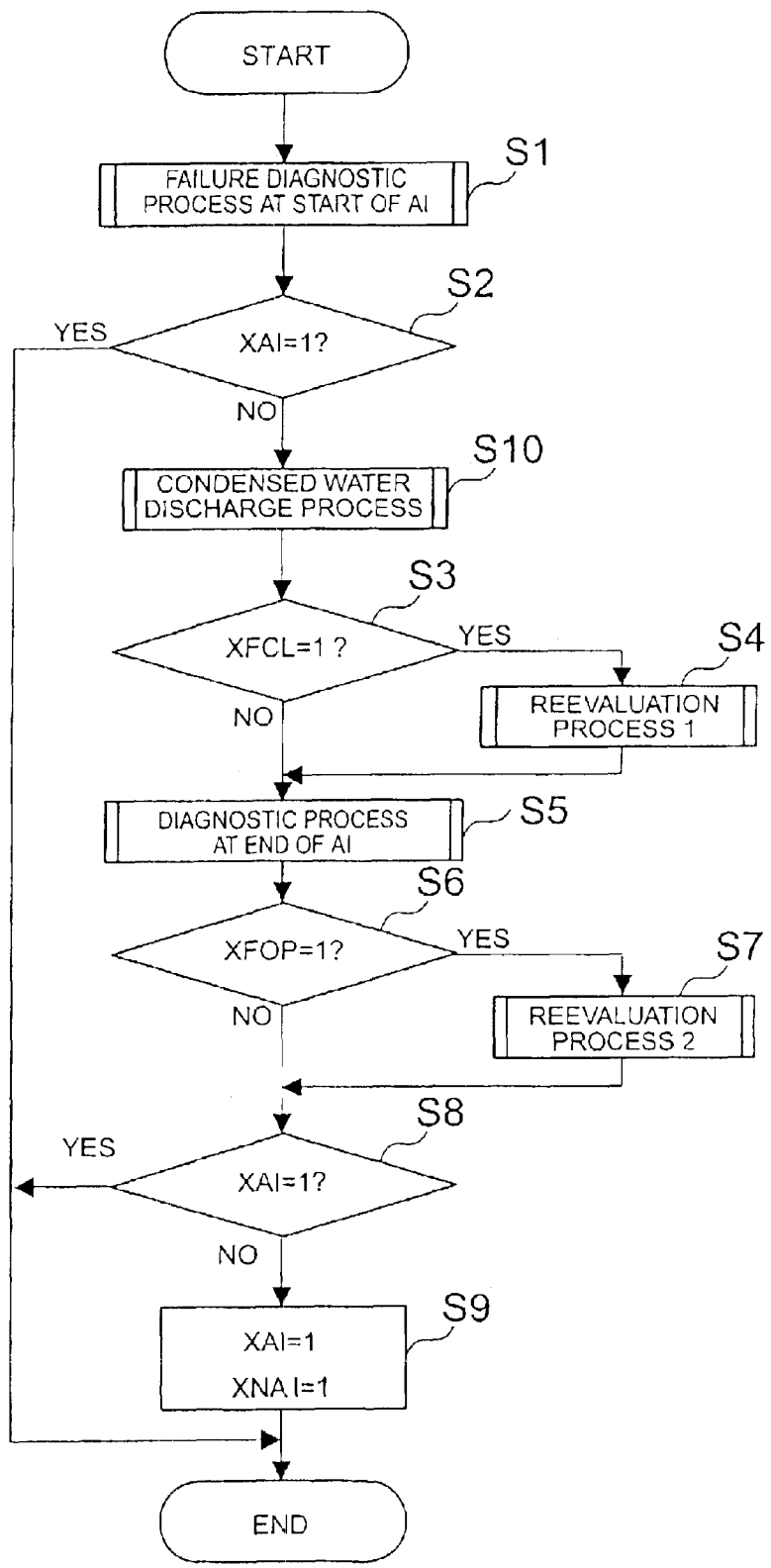
FIG. 23 is a main flowchart of a fifth embodiment of combinational control in the apparatus of FIG. 1.

It is also possible to perform the determination process after execution of the condensed water discharge. It is, however, noted that if the condensed water is frozen the condensed water discharge process immediately after starting of the engine will fail to discharge the condensed water, and it is thus preferable to discharge the condensed water after a warm-up. FIG. 23 is a flowchart showing a fifth embodiment of combinational control. The present embodiment is configured to perform the condensed water discharge process between step S2 and step S3 in the flow of the failure diagnostic process shown in FIG. 2. At this point of time, the warm-up of the engine 2 is finished, so that the frozen condensed water should be melted with a high possibility. At this point ASV 13 is opened and the natural purge is carried out with AP 12 at a halt, or AP 12 is also actuated to effect the forced purge, thereby discharging the condensed water. After this, the reevaluation process or the determination process at ending of AI is carried out, whereby an accurate decision can be made in a state without condensed water.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An auxiliary air supplying system for supplying auxiliary air to upstream of an catalytic converter in an exhaust system of an internal combustion engine under a predetermined condition, comprising of:
   a passage for auxiliary air supply configured to open after a complete warm-up to effect purge of the auxiliary air supply passage; and
   a failure diagnostic section configured to perform a diagnosis of failure at cold starting and, when the result of the diagnosis predicts an anomaly due to freezing, further to perform a reevaluation after the complete warm-up, wherein the purge of the auxiliary air supply passage is performed according to the result of the reevaluation.

2. The auxiliary air supply apparatus according to claim 1, wherein said reevaluation after the complete warm-up is performed only during a fuel cut period or during a light load period.

3. The auxiliary air supply apparatus according to claim 1, wherein when the result of the diagnosis of failure at cold starting predicts a closing anomaly due to freezing, the supply of auxiliary air is stopped.

4. The auxiliary air supply apparatus according to claim 3, wherein when the result of the diagnosis of failure at cold starting predicts a freezing failure of an air pump, the air pump is stopped more promptly than in the case of detection of other anomalies of the auxiliary air supply apparatus.

5. The auxiliary air supply apparatus according to claim 1, wherein when the result of the diagnosis of failure at cold starting predicts an opening anomaly due to freezing, the supply of auxiliary air is continued.

6. The auxiliary air supply apparatus according to claim 1, further comprising an air pump for the supply of auxiliary air, wherein the air pump is activated during said purge.

7. The auxiliary air supply apparatus according to claim 6, further comprising estimating means for estimating a location of condensed water, wherein the air pump is switched between activation and deactivation during the purge according to the location of condensed water.

8. The auxiliary air supply apparatus according to claim 1, wherein when a temporary failure due to freezing is detected, said purge is performed for a longer time than when no failure is detected.

9. The auxiliary air supply apparatus according to claim 1, wherein a time of said purge is adjusted according to outside air temperature.

10. The auxiliary air supply apparatus according to claim 1, wherein a time of said purge is adjusted according to a location of freezing determined.

11. A method of controlling the auxiliary air supply apparatus as set forth in claim 1, wherein said purge is performed after a halt of the internal combustion engine.

12. A method of controlling the auxiliary air supply apparatus as set forth in claim 1, wherein said purge is prohibited during catalyst deterioration restraining control.

13. An auxiliary air supplying system for supplying auxiliary air to upstream of a catalytic converter in an exhaust system of an internal combustion engine under a predetermined condition, comprising of:
   a failure diagnostic section configured to perform a diagnosis of failure at cold starting and, when the result of the diagnosis predicts an anomaly due to freezing, further to perform a reevaluation after a warm-up.

14. The auxiliary air supply apparatus according to claim 13, wherein said reevaluation after the warm-up is performed only during a fuel cut period or during a light load period.

15. The auxiliary air supply apparatus according to claim 13, wherein when the result of the diagnosis of failure at cold starting predicts a closing anomaly due to freezing, the supply of auxiliary air is stopped.

16. The auxiliary air supply apparatus according to claim 15, wherein when the result of the diagnosis of failure at cold starting predicts a freezing failure of an air pump, the air pump is stopped more promptly than in the case of detection of other anomalies of the auxiliary air supply apparatus.

17. The auxiliary air supply apparatus according to claim 13, wherein when the result of the diagnosis of failure at cold starting predicts an opening anomaly due to freezing, the supply of auxiliary air is continued.

18. The auxiliary air supplying system according to claim 13, further comprising a passage for auxiliary air supply configured to open after a complete warm-up to effect purge of the auxiliary air supply passage, wherein the purge of the auxiliary air supply passage is performed and thereafter the failure diagnostic section further performs a reevaluation.

19. The auxiliary air supply apparatus according to claim 18, wherein said reevaluation after the warm-up is performed only during a fuel cut period or during a light load period.

20. The auxiliary air supply apparatus according to claim 18, wherein when the result of the diagnosis of failure at cold starting predicts a closing anomaly due to freezing, the supply of auxiliary air is stopped.

21. The auxiliary air supply apparatus according to claim 20, wherein when the result of the diagnosis of failure at cold starting predicts a freezing failure of an air pump, the air pump is stopped more promptly than in the case of detection of other anomalies of the auxiliary air supply apparatus.

22. The auxiliary air supply apparatus according to claim 18, wherein when the result of the diagnosis of failure at cold starting predicts an opening anomaly due to freezing, the supply of auxiliary air is continued.

23. A failure diagnostic method of an auxiliary air supplying system of diagnosing a failure of the auxiliary air supply apparatus for supplying auxiliary air to upstream of a catalytic converter in an exhaust system of an internal combustion engine under a predetermined condition, comprising of:

performing a reevaluation after a warm-up when the result of a diagnosis of failure carried out during a cold period predicts an anomaly due to freezing of the auxiliary air supply apparatus.

24. The failure diagnostic method according to claim 23, wherein performing the reevaluation after the warm-up is performed only during a fuel cut period or during a light load period.

25. The failure diagnostic method according to claim 23, wherein when the result of the diagnosis of failure during the cold period predicts a closing anomaly due to freezing of the auxiliary air supply apparatus, the supply of auxiliary air is stopped.

26. The failure diagnostic method according to claim 25, wherein when the result of the diagnosis of failure during the cold period predicts a freezing failure of an air pump, the air pump is stopped more promptly than in the case of detection of other anomalies.

27. The failure diagnostic method according to claim 23, wherein when the result of the diagnosis of failure during the cold period predicts an opening anomaly due to freezing, the supply of auxiliary air is continued.

28. The failure diagnostic method according to claim 23, wherein after a warm-up, an auxiliary air supply passage is temporarily opened to discharge condensed water and thereafter said reevaluation is performed.

29. The failure diagnostic method according to claim 28, wherein an air pump is forced to operate during said discharge of condensed water.

30. A discharge control method in the method as set forth in claim 29, wherein a location where condensed water stays is estimated and the air pump is switched between activation and deactivation during said discharge of condensed water according to the location of condensed water.

31. A discharge control method in the method as set forth in claim 28, wherein a time of said discharge is adjusted according to outside air temperature.

32. A discharge control method in the method as set forth in claim 28, wherein a time of said discharge is adjusted according to a location of freezing determined.

33. A discharge control method in the method as set forth in claim 28, wherein control of said discharge is prohibited during catalyst deterioration restraining control.

34. A discharge control method of condensed water staying in a passage of an auxiliary air supplying system for supplying auxiliary air to upstream of a three-way catalytic converter in an exhaust system of an internal combustion engine under a predetermined condition, comprising of:

performing a diagnosis of failure of the auxiliary air supply apparatus at cold starting;

performing a reevaluation after a warm-up to determine whether a freezing anomaly is present, when the result of the diagnosis predicts an anomaly due to freezing of the auxiliary air supply apparatus;

performing a control of discharge of condensed water when a freezing anomaly is present; and opening the auxiliary air supply passage after a complete warm-up to effect purge of the auxiliary air supply passage.

35. The discharge control method according to claim 34, wherein an air pump is forced to operate during said purge.

36. The discharge control method according to claim 35, wherein a location where condensed water stays is estimated and the air pump is switched between activation and deactivation during said purge according to the location of condensed water.

37. The discharge control method according to claim 34, wherein a time of said purge is adjusted according to a location of freezing determined.

38. The discharge control method according to claim 34, wherein control of discharge is performed for a longer time in the case of a freezing anomaly than in the other cases.

39. The discharge control method according to claim 38, wherein a time of said purge is adjusted according to a location of freezing determined.

40. The discharge control method according to claim 34, wherein a time of said purge is adjusted according to outside air temperature.

41. The discharge control method according to claim 34, wherein said purge is performed after a halt of the internal combustion engine.

42. The discharge control method according to claim 34, wherein said purge is prohibited during catalyst deterioration restraining control.

43. An auxiliary air supplying system for supplying auxiliary air to upstream of a catalytic converter in an exhaust system of an internal combustion engine under a predetermined condition, comprising of a passage for auxiliary air supply configured to open after a complete warm-up to effect purge of the auxiliary air supply passage only when there is a possibility of an anomaly due to freezing.

* * * * *